(12) United States Patent
Dallas et al.

(10) Patent No.: US 9,430,158 B2
(45) Date of Patent: *Aug. 30, 2016

(54) IN-FLIGHT COMMAND QUEUE DEPTH MANAGEMENT

(71) Applicant: NetApp, Inc., Sunnyvale, CA (US)

(72) Inventors: William D. Dallas, Merrimack, NH (US); Edward John Barron, Pepperell, MA (US); Chris A. Busick, Shrewsbury, MA (US)

(73) Assignee: NetApp, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/748,570

(22) Filed: Jun. 24, 2015

(65) Prior Publication Data

US 2015/0347031 A1    Dec. 3, 2015

Related U.S. Application Data

(63) Continuation of application No. 14/292,558, filed on May 30, 2014.

(51) Int. Cl.
*G06F 13/12* (2006.01)
*G06F 13/38* (2006.01)
*G06F 3/06* (2006.01)

(52) U.S. Cl.
CPC ............ *G06F 3/0611* (2013.01); *G06F 3/061* (2013.01); *G06F 3/0653* (2013.01); *G06F 3/0656* (2013.01); *G06F 3/0659* (2013.01); *G06F 3/0673* (2013.01); *G06F 3/0683* (2013.01)

(58) Field of Classification Search
None
See application file for complete search history.

(56) References Cited

U.S. PATENT DOCUMENTS

| 5,822,527 A | 10/1998 | Post | |
|---|---|---|---|
| 5,867,736 A * | 2/1999 | Jantz | G06F 3/0601 710/74 |
| 8,285,923 B2 * | 10/2012 | Stevens | G06F 12/1416 711/112 |
| 2009/0125550 A1 | 5/2009 | Barga et al. | |
| 2013/0067147 A1 * | 3/2013 | Okita | G06F 12/0246 711/103 |

* cited by examiner

*Primary Examiner* — Elias Mamo
(74) *Attorney, Agent, or Firm* — LeClairRyan, a Professional Corporation

(57) ABSTRACT

An indication of an event is received at a storage controller. The indication of the event corresponds to a first severity. It is determined that the event is associated with a first stream of commands. It is determined whether the indication of the event is the first indication of the event received by the storage controller. If the indication of the event is the first indication of the event received by the storage controller, a maximum allowed count of in-flight commands to be less than a current count of in-flight commands is set. If the indication of the event is not the first indication of the event received by the storage controller, it is determined that the first severity is greater than a second severity corresponding to a previously received indication. If the first severity is greater than the second severity, the maximum allowed count of in-flight commands is decreased.

18 Claims, 13 Drawing Sheets

IN-FLIGHT COMMAND QUEUE DEPTH MANAGEMENT

RELATED APPLICATIONS

This application claims the priority benefit of U.S. patent application Ser. No. 14/292,558 filed May 30, 2014.

BACKGROUND

Aspects of the disclosures herein generally relate to the field of storage systems, and, more particularly, to detecting persistent events within a storage system Far removed from single hard drives, storage systems can include many different controllers, devices, and other components, from many different manufacturers. The components that make up the storage system might all compete for various shared resources. Further, communication among some components competing for the shared resources may not be possible, making coordination of resource sharing difficult. Common protocols used to communicate might have been designed when storage systems were simpler and more homogenous, and thus might lack functionality useful to a particular storage system or component within a storage system.

OVERVIEW

To effectively manage I/O commands in accordance with the state of storage devices targeted by the I/O commands and/or the state of endpoints associated with targeted storage devices, a storage controller can manage the queue depth for in-flight I/O commands. When a storage controller initially detects an event ("trigger event"), a storage controller can reduce the allowable number of in-flight commands. By reducing the allowable number of in-flight commands, the load on the storage controller is reduced, allowing the storage controller to take compensatory action in response to the trigger event. The storage controller may increase the allowable number of in-flight commands upon determining that the trigger event has been resolved or after a specified period of time. The allowable number of in-flight commands may be reduced more or less based on the severity of the trigger event. For example, if the trigger event has a low severity, the storage controller may reduce the current allowable number of in-flight commands by a lower number than if the event had a high severity. Additionally, the storage controller may further reduce the allowable number of in-flight commands in response to an increase in the severity of the trigger event or increase the allowable number of in-flight commands in response to a decrease in the severity of the trigger event.

BRIEF DESCRIPTION OF THE DRAWINGS

The disclosures may be better understood, by referencing the accompanying drawings.

DESCRIPTION OF EXAMPLE ILLUSTRATION(S)

Figure 1:
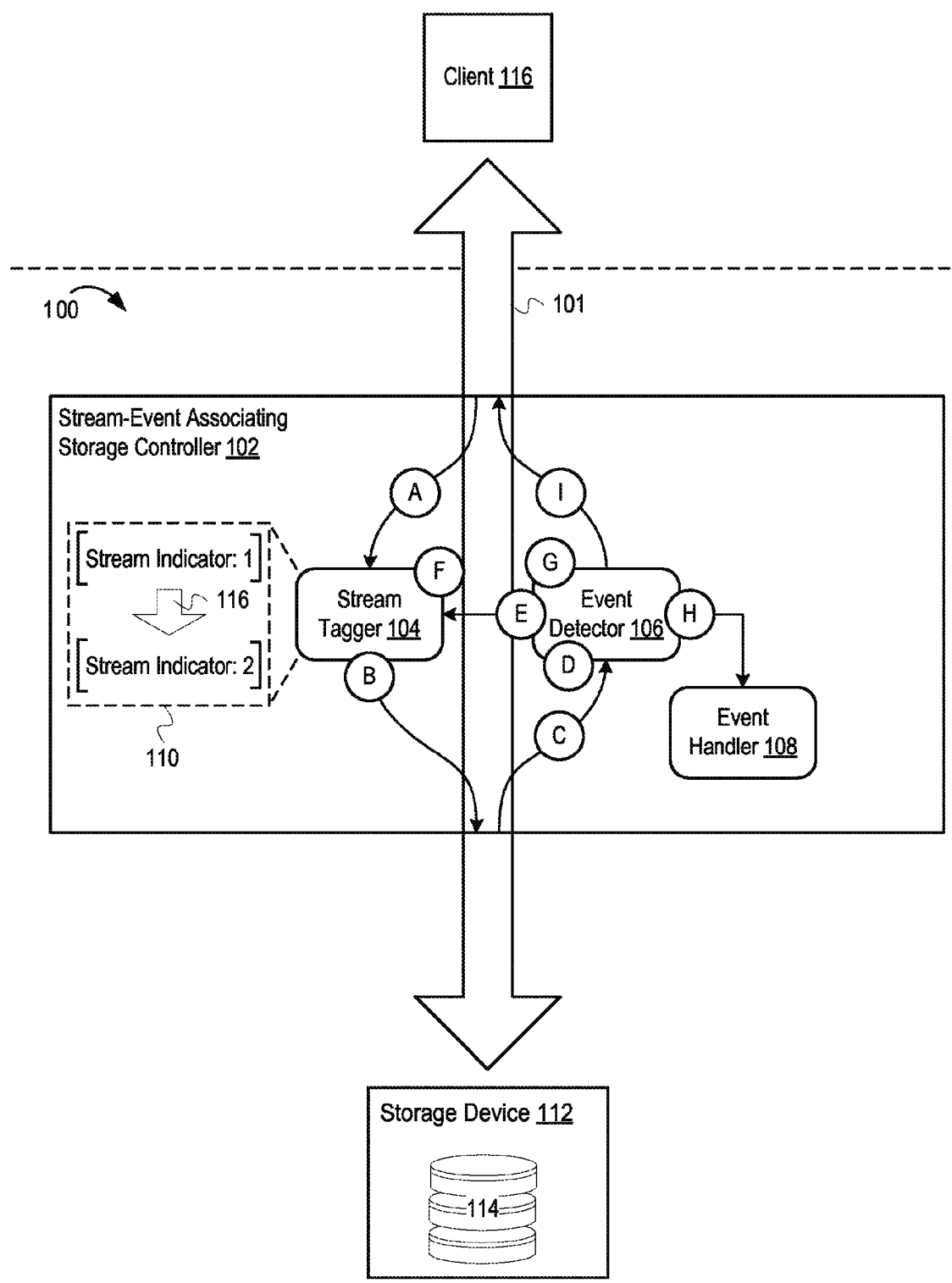
FIG. 1 depicts an example storage system with a stream-event associating storage controller.

The description that follows includes example systems, methods, techniques, instruction sequences and computer program products that embody techniques of the disclosures herein. However, it is understood that the described aspects may be practiced without these specific details. For instance, although examples refer to Small Computer System Interface ("SCSI"), the disclosures herein are applicable to other protocols as well, including Fibre Channel. In other instances, well-known instruction instances, protocols, structures and techniques have not been shown in detail in order not to obfuscate the description.

To effectively manage I/O commands in accordance with state of storage devices targeted by the I/O commands and/or state of endpoints to the targeted storage devices, a storage controller can distinguish I/O commands based on targeted storage device and events corresponding to the targeted storage device and/or endpoints to the targeted storage device. The storage controller associates tags or markers to distinguish I/O commands. When a storage controller initially detects an event ("trigger event") that leads to a compensatory action being taken within the encompassing storage system, a storage controller can distinguish I/O commands impacted by a trigger event (e.g., a resource contention event) and I/O commands likely not impacted by the trigger event. This distinction is based on two presumptions. When a storage controller encounters an I/O command response that indicates a trigger event, the storage controller operates under the presumption that in-flight I/O commands and pending I/O command responses (i.e., received but not yet processed responses) ("post-flight I/O commands") will be impacted by the trigger event or a corresponding event. For instance, a low memory event may be indicated by a first I/O command response and a low performance event indicated by a subsequently received I/O command response. Both of these likely arise from the same root cause at a storage device. The storage controller also presumes that newly received (or received but not yet sent) I/O commands (pre-flight I/O commands) will not be impacted by the trigger event (or events corresponding thereto) because a triggered compensatory action will have cured the issue, at least to some extent. Although the distinction is based upon presumptions, the storage controller gains efficiency by not repeatedly invoking a same compensatory action or even different compensatory actions for a same root cause. Furthermore, the storage controller avoids obfuscating the root cause with overlapping compensatory actions that may change the indicated events without resolving the root cause.

This description refers to I/O commands distinguished based on different events and different target storage devices as different streams of commands for ease of explanation. But the term "stream" does not require any continuous flow of I/O commands. The term "stream" is also not being used to suggest any constant or predictable rate of I/O commands. The term "stream" is used for ease in explaining that commands are distinguished based on trigger events and a corresponding storage device. The flow of I/O commands will depend upon the source of the I/O commands. Also, the description refers to commands being distinguished based on events. However, I/O commands can also be considered to be distinguished based on other related factors, such as the compensatory action itself. As stated above, the distinction between I/O commands is based on the two presumptions about impact. The second presumption is that the pre-flight I/O commands are being sent to a storage device after a compensatory action has been (is being) taken. Thus, events indicated (if any) by responses to these I/O commands arise from a different issue. If the storage system element that selects or initiates the compensatory action can communicate that action to the storage system element that maintains the distinguishing tags, then I/O commands can be tagged in accordance with the compensatory action that is taken. In addition, the I/O commands can be distinguished based on when the compensatory action is taken. For instance, the tagging storage system element can use historical data to determine a window of time for the issue to be typically resolved. The tagging storage system element can then manage the tagging accordingly (e.g., update the tag for I/O commands that fall outside of that window of time). The term "tag" is used herein to refer to a value associated with a set of one or more entities to distinguish those set of one or more entities from other entities based on a particular characteristic. Within the context of this disclosure(s), the entities are I/O commands and the particular characteristic is association with an aspect of a compensatory action triggering event and a corresponding storage device.

Storage systems typically include multiple storage controllers and multiple storage devices. The storage controllers receive I/O commands from any number of clients. The storage controllers process the I/O commands and send the I/O commands to the storage devices. The storage devices perform operations associated with the I/O commands and send responses back to the storage controllers. The storage controllers process the responses received from the storage controllers and send responses to the clients.

The I/O commands are generally specified as part of a protocol, such as the SCSI protocol, implemented by compatible devices. In some instances, protocols may not have functionality to communicate all information that might be useful to users of a storage system. For example, while a protocol might allow for errors to be communicated on a per I/O command basis, the protocol might not be capable of indicating when the errors are related.

Consider an example storage system that includes a single storage controller and a single storage device. The storage controller and storage device communicate asynchronously, meaning that the storage controller does not need to wait to receive a response to an I/O command before sending another I/O command. During operation of the example storage system, various "events" might occur. A few examples of types of events include: an error that prevents the storage device from writing data to a drive, corruption of a response from a storage device during transmission, and resource contention. While some events are associated with individual I/O commands, many events are associated with groups (or streams) of I/O commands. For instance, resource convention events correspond to streams of I/O commands. A resource contention event occurs when the resources available to a component are inadequate to handle a particular workload. For example, if multiple clients are accessing a single storage device, the clients might overwhelm the storage device, resulting in the storage device running out of memory, maxing out the performance of a processor, etc. When the storage device cannot adequately process I/O commands, a resource contention event occurs.

Unlike events associated with individual I/O commands, events like resource contention events can be persistent across multiple I/O commands. However, in some instances, these persistent events appear as individual events associated with individual I/O commands. For example, a protocol may not include functionality that allows for events to be communicated between components absent an I/O command or I/O command response. In other words, a storage device might not be able to send an individual message indicating that the storage device is out of memory and an individual message indicating when the storage device has freed memory. Instead, the storage device may be limited to including messages in an I/O command responses. Thus, each I/O command response that the storage device manages to send while it is out of memory indicates the out of memory or low memory event.

To a storage controller or other component that receives the I/O command responses, messages contained in the I/O command responses appear to be individual events instead of a same event being redundantly communicated (i.e., single persistent event). As such, the storage controller might take action that is not the most appropriate for the given situation. For example, the storage controller might take compensatory action for each individual indication of an event, even though the indications are related to a single, persistent event. As another example, the storage controller might take compensatory action for the first indication of an event, ignoring subsequent indications. The storage controller, however, might not be able to determine when the event ends and another begins (possibly requiring additional compensatory actions).

In order to take appropriate actions, a storage controller can define I/O command streams based on observed events. This will allow the storage controller to identify an event that persists across multiple I/O command responses and react accordingly. A storage controller can tag each outgoing I/O command with a stream indicator. When the storage controller receives an indication that an event occurred, the storage controller associates the event indication with a particular stream of I/O commands and action is taken to compensate for the event. Additionally, the storage controller begins a new stream of commands by updating the stream indicator to a value different from the previous stream indicator. After the stream indicator is updated, the I/O commands are tagged with the updated stream indicator, thus signifying that the I/O commands are associated with a different stream than the I/O commands sent prior to the stream indicator update. If a second event indication is received, the storage controller determines whether the second event indication indicates a new event or a previous, persistent event. To determine whether the second event indication indicates a new event or a previous, persistent event, the storage controller determines whether the second event indication is associated with the same stream of I/O commands as the first event indication or a more recent stream of I/O commands. If the second event indication is associated with the same stream of I/O commands as the first event indication, the storage controller determines that the first and second event indications are both associated with a single, persistent event.

If the storage controller determines that the first and second event indication are both associated with a single, persistent event, the storage controller then determines whether the severity of the event has increased. To determine whether the severity of the event has increased, the storage controller compares severities associated with the first event indication and the second event indication. If the severity associated with the second event indication is greater than the severity associated with the first event indication, the storage controller takes further compensatory action.

If the storage controller determines that the second event indication is associated with a different stream of I/O commands than the first event indication, the storage controller determines that the first and second event indications are associated with two different events. The storage controller thus treats the second event indication as a new event and takes appropriate compensatory action.

FIG. 1 depicts an example storage system with a stream-event associating storage controller. FIG. 1 depicts an example storage system 100, including a stream-event associating storage controller (hereinafter "storage controller") 102 and a storage device 112 communicatively coupled with the storage controller 102. The storage controller 102 includes a stream tagger 104, an event detector 106, and an event handler 108. The storage device includes a disk array 114. FIG. 1 also depicts a client 116 communicatively coupled with the storage controller 102.

The disclosures herein will use resource contention events as example persistent events. Resource contention events can be indicated in multiple ways. For example, an I/O command response might indicate that an I/O command queue at the storage device 112 is full. As another example, the storage controller 102 can track the length of time an I/O command response has not been received for a particular I/O command. If the length of time surpasses a threshold, the storage controller 102 determines that the I/O command timed out, which may be another indication of a resource contention event. I/O commands that have been sent to the storage device 112 are referred to as in-flight I/O commands until an I/O command response has been received. "Resource contention event" will be referred to as "event" hereinafter. When necessary to distinguish events, an event that is being detected, processed, handled, etc., is referred to as the "current" event.

In addition to indicating an event, an I/O command response can also indicate event severity explicitly, implicitly, in absolute terms, and/or in relative terms. For example, an I/O command response can indicate an event that is defined as having a lower severity than an I/O command timeout (i.e., implicitly indicates a severity in terms relative to another event). Explicit indications of severity can be generally indicated using integers and follow the natural ordering of integers. Thus, the lowest severity might be "1", the next lowest severity might be "2", etc.

The disclosures herein will use queue depth modifications as example compensatory actions. The storage controller 102 maintains a queue that indicates how many I/O commands are in-flight. When the storage controller 102 sends an I/O command to the storage device 112, the storage controller 102 pushes the I/O command (or indication thereof) onto the queue. When the storage controller 102 receives an I/O command response, the storage controller 102 removes the associated I/O command (or indication thereof) from the queue. The "current queue depth" is the number of in-flight I/O commands. If the current queue depth equals a "maximum queue depth", the storage controller 102 will not send any additional I/O commands until the current queue depth is below the maximum queue depth.

During operation, the client 116 generates and transmits I/O commands that refer to data or metadata stored on the storage device 112. The storage controller 102 receives the I/O commands from the client 116 and performs various operations, including processing I/O commands, handling errors, etc. The processed I/O commands are then sent to the storage device 112 by the storage controller 102. The storage device 112 performs operations associated with the processed I/O commands, such as reading data off of the disk array 114. The storage device 112 sends I/O command responses back to the storage controller 102. The storage controller 102 can perform additional operations to the responses, such as aggregating responses to single processed I/O command responses, handling errors, etc. The processed I/O command responses are then sent to the client 116.

Arrow 101 depicts the flow of I/O commands from the client 116 to the storage device 112 and responses from the storage device 112 to the client 116 via the storage controller 102. This flow of I/O commands and I/O command responses typically occurs throughout the operation of the storage system 100. Stages A-I occur during this flow of I/O commands and I/O command responses. In the example depicted in FIG. 1, the I/O commands flow through the stream tagger 104 on their way to the storage device 112. Similarly, the responses flow through the event detector 106 on the way to the client 116. As mentioned above, the storage controller 102 might perform processing operations on the I/O commands and the I/O command responses. The operations described at stages A-I can be performed before, after, or at the same time as other operations performed by the storage controller 102.

Stages A-I illustrate the various operations performed by the storage controller 102 to detect and handle persistent events.

At stage A, the stream tagger 104 receives I/O commands. The I/O commands might be the same I/O commands sent by the client 116 or might be processed by the storage controller 102. For example, the storage controller 102 might present a logical view of the storage device 112 that differs from the actual configuration. For example, the disk array 114 might comprise multiple disks. The storage controller 102 might present the multiple disks, to the client 116, as a single logical disk. The storage controller 102 translates the logical references used by the client 116 into the physical references used to access the disk array 114. A set of blocks that appear to the client 116 as contiguous might actually be located on different disks within the disk array 114. Thus, the storage controller 102 might break a single I/O command received from the client 116 into multiple I/O commands that are sent to the storage device 112.

At stage B, the stream tagger 104 tags each I/O command with the current stream indicator and passes the tagged I/O command to another component of the storage controller 102. To tag the I/O command, the stream tagger 104 stores a copy of the current stream indicator in metadata associated with the I/O command. The metadata can be identified by a unique identifier for the I/O command, such as a sequence number. A response to the I/O command includes the unique identifier of the I/O command, which allows the storage controller to access the associated metadata. The particular technique used to tag the I/O command can vary depending on the protocol(s) implemented. For example, some protocols might allow metadata to be stored in an I/O command itself. The metadata stored in the I/O command can then returned with an associated I/O command response. In such instances, the storage controller 102 can store the I/O command stream indicator in each of the I/O commands as metadata. When the storage controller 102 receives an I/O command response, the storage controller 102 can analyze the metadata of the I/O command response to determine the I/O command stream identifier. The examples described herein will assume that the I/O command stream indicator is determined by accessing metadata identified by the I/O command's unique identifier.

At stage C, the event detector 106 receives I/O command responses from the storage device 112. The event detector 106 might not receive the I/O command responses directly from the storage device. For example, the I/O command responses might pass through other components of the storage controller 102, undergo processing by the storage controller 102, etc. prior to being received by the event detector 106.

At stage D, the event detector 106 detects the occurrence of an event and determines whether the event is a new event or a previously detected event. The event detector 106 detects the event based on a received event indication. Events can be indicated in a variety of ways. For example, an I/O command response might include a value, such as an error number, that indicates an event occurred. As another example, the event detector 106 might get a notification whenever an I/O command has timed out, which can serve as an event indication. The received event indication is generally associated with a particular I/O command. The received event indication can include the unique identifier of the particular I/O command, allowing the event detector 106 to access the metadata associated with the I/O command and thus determine the I/O command stream indicator for the particular I/O command. If the I/O command response does not indicate an event, then the I/O command response continues on from the event detector 106 to the client 116 if no other processing is to be done to the I/O command response.

The event detector 106 also determines whether the event indication is associated with a new event or a previously detected event. To determine whether the event indication is associated with a new event or a previously detected event, the event detector 106 determines which I/O command is associated with the event indication and determines the I/O command stream indicator for the I/O command. The event detector 106 then compares the I/O command stream indicator with the current stream indicator. If the I/O command stream indicator is the same as the current stream indicator, the event indication is associated with a new event. If the I/O command stream indicator is not the same as the current stream indicator, the event indication is associated with a previously detected. To distinguish streams, the storage controller 102 updates the current stream indicator when an event is newly detected, as described in more detail below. Thus, if the current stream indicator does not match the I/O command stream indicator, the current stream indicator has already been updated in response to receiving a previous event indication associated with an event.

The next operation(s) performed by the storage controller 102 varies. If the detected event is a new event (signified by the I/O command stream indicator matching the current stream indicator), the storage controller 102 (by way of the event detector 106, stream tagger 104, and event handler 108) performs the operations of stages E and F. If the detected event is not a new event (signified by the I/O command stream indicator not matching the current stream indicator), the event detector 106 performs the operation(s) at stage G.

Stages E and F

At stages E and F, the event detector 106 notifies the stream tagger that a new event has been detected. The stream tagger 104 then updates the current stream indicator to indicate that I/O commands sent after the update belong to a different stream.

At stage E, the event detector 106 notifies the stream tagger 104 that a new event has been detected. The technique used to notify the stream tagger 104 can vary. For example, the stream tagger 104 can be notified via a function call(s), application programming interface call(s), inter-process messaging, etc. The event detector 106 might also communicate with the stream tagger 104 via a hardware mechanism, such as writing a value to a particular register or latch, sending a particular signal over a particular wire, etc.

At stage F, the stream tagger 104 updates the current stream indicator to indicate that a new stream of I/O commands has begun. The specific update to the current stream indicator can vary depending on the particular value(s) used for the current stream indicator. For example, the current stream indicator can be an integer, as depicted in box 110. If the current stream indicator is an integer, the stream tagger 104 can increment the current stream indicator, as indicated by arrow 116. If the current stream indicator is represented by a different type of value, the stream tagger 104 can be modified as appropriate for the particular type of value. Regardless of the particular updating technique, the stream tagger 104 will start tagging I/O commands with a current stream indicator that is distinct from the stream indicator used to tag I/O command(s) prior to the stream indicator update.

Stage G

As described above, if the event is a previously detected event, stage G is performed instead of stages E and F.

At stage G, the event detector 106 determines whether the severity of the event has increased based, at least in part, on the most recently received event indication. The severity of a particular event can be determined based on the event indication. A few examples for indicating severity include: using an enumeration that maps event indications to severities and using ordered event indicators. To illustrate, the event detector 106 might have access to a list or other data structure that maps an event indicator (such as an error type) to a particular severity. As another example, events can be defined as having event indicators that indicate the severity of the events in relation to each other (e.g. using integers as event indicators). In such cases, the event indicators can be compared, with a larger event indicator being a more severe event, for example.

Determining an increase in event severity allows the event detector 106 to determine whether additional action should be taken in addition to previous action taken for the event. This allows the amount of compensatory action to better reflect the nature of the event without overly reducing the performance of the storage controller 102.

Severity is just one example of a comparison that might be made in order to determine whether the compensatory action should be taken in response to receiving an indication of an event. For example, the event detector 106 might determine that different actions are appropriate for different types of event indications (e.g., an error message in an I/O command response versus an I/O command timeout). Thus, the event detector 106 can also analyze other aspects of the event indications to determine whether action should be taken.

In the examples discussed herein, if the event severity does not increase, the operation(s) at stage H is not performed. If the event severity increases, the operation(s) at stage H is performed. Further, if it was determined at stage D that the event is a new event, the operation(s) at stage H is also performed.

At stage H, the event detector 106 notifies the event handler 108 that a new event has been detected or that the severity of a previously detected event has increased. The event detector 106 can include data identifying the particular event, such as an event type, error number, event severity, etc. The event detector 106 can also include data about the particular I/O command associated with the event, such as the I/O command type (e.g., read or write), which stream it is part of, etc. The operations performed by the event detector 106 to notify the event handler 108 can vary depending on the particular event, I/O command, etc. Examples of event handling are discussed in more detail below.

As mentioned above at stage E, the stream indicator is used to differentiate multiple streams. The specific stream indicators can vary depending on the characteristics of the storage system 100. For example, the stream indicator might be an integer that is incremented each time a new event is detected. If the stream indicator reaches a maximum value, the stream indicator can be reset to zero. As another example, the storage controller 102 can maintain a list of all stream indicator values that are associated with in-flight I/O commands along with a count of the number of in-flight I/O commands tagged with a particular stream indicator value. When the storage controller 102 receives a response to an I/O command that is tagged with the particular stream indicator value, the storage controller 102 can decrement the count of the number of outstanding I/O commands tagged with the particular stream indicator value. Thus, when the stream tagger 104 updates the stream indicator value after being notified of the occurrence of a new event, the stream tagger 104 can use a value that is not associated with any in-flight I/O commands.

Figure 2:
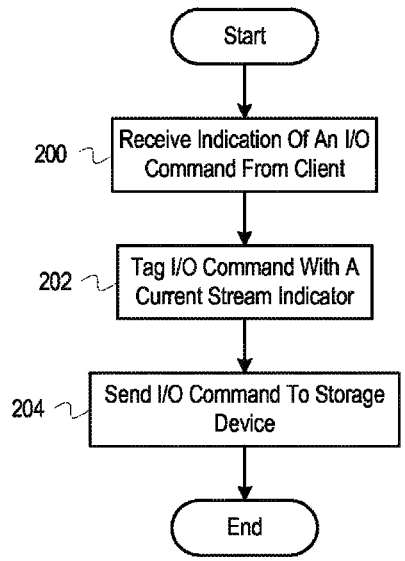
FIG. 2 depicts a flowchart of example operations for tagging I/O commands to indicate an association with a stream of I/O commands.

FIG. 2 depicts a flowchart of example operations for tagging I/O commands to indicate an association with a stream of I/O commands. The operations depicted in FIG. 2 can be performed by the stream tagger 104 of FIG. 1 or another component of a storage system.

At block 200, a stream tagger receives an I/O command. As described above, the stream tagger receives an I/O command from a client. The I/O command might have undergone processing prior to actually reaching the stream tagger. The stream tagger might receive the I/O command via a function call(s), application programming interface call(s), inter-process messaging, etc. The stream tagger might also receive the I/O command via a hardware mechanism, such as writing a value to a particular register or latch, writing the value to a particular memory location, etc. After the stream tagger receives the I/O command, control then flows to block 202.

At block 202, the stream tagger tags the I/O command with a current stream indicator. The current stream indicator is a value that identifies the current stream of I/O commands, as described above. To tag the I/O command, the stream tagger stores the current stream indicator (or a value representing the current stream indicator) in metadata associated with the I/O command. The metadata can be identified by the unique identifier that identifies the I/O command itself, thus allowing the metadata to be accessed after a response to the I/O command is received. The specific technique used by the stream tagger to tag the I/O command can vary, however. For example, the I/O command might allow custom fields, such as metadata fields, to be included in the body of the I/O command itself. In such cases, the stream tagger can store the current stream indicator in the actual I/O command. After the stream tagger tags the I/O command with the current stream indicator, control then flows to block 204.

At block 204, the stream tagger sends the I/O command to a storage device. The I/O command is typically transmitted to the storage device by a storage controller or other component that encompasses the stream tagger itself. Thus, the stream tagger can provide the I/O command to another component. As such, the stream tagger itself might not send the tagged I/O command, but merely forward the I/O command to the appropriate component. After the stream tagger sends the I/O command to a storage device, the process ends.

Figure 3:
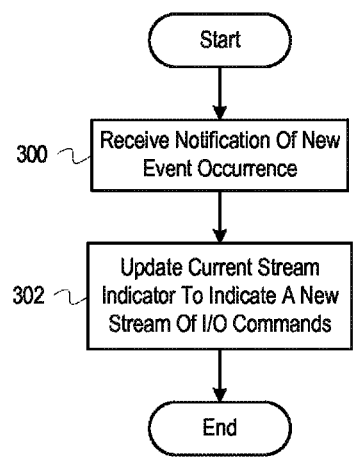
FIG. 3 depicts a flowchart of example operations for updating a stream indicator in response to the detection of a new event occurrence.

FIG. 3 depicts a flowchart of example operations for updating a stream indicator in response to the detection of a new event occurrence. The operations depicted in FIG. 3 can be performed by the stream tagger 104 of FIG. 1 or another component of a storage system.

At block 300, a stream tagger receives a notification that a new event has occurred. A new event occurs when an indication of the event is received and the associated I/O command stream indicator is the same as the current stream indicator. The stream tagger can receive a notification in various ways as previously mentioned. The notification might be a single value indicating that the event occurred or might include additional data. Examples of the additional data include an event type and a stream indicator associated with the event. After the stream tagger receives the notification that the new event has occurred, control then flows to block 302.

At block 302, the stream tagger updates the current stream indicator to indicate a new stream of I/O commands. A stream indicator uniquely identifies a particular stream of I/O commands. The particular stream of I/O commands might not need to be uniquely identifiable on a global scale (e.g., from the start of storage system operations until cessation of storage system operations), but is typically unique within a certain time frame. The technique used to update the current stream indicator can vary depending on the particular stream indicators used. For example, the current stream indicator can be an integer that is incremented by one for each new stream of I/O commands. If the current stream indicator is an integer, the stream tagger can cause the current stream indicator to reset to a base value (e.g., zero) once the current stream indicator reaches a maximum value. The longer a particular stream of I/O commands should be unique, the greater the maximum value is, and vice versa. As another example, the stream tagger can maintain a list of stream indicators that are associated with in-flight I/O commands. Once a response or timeout occurs for each in-flight command associated with a particular stream indicator, the particular stream indicator becomes available to the stream tagger again. The stream tagger can then select any available stream indicator. After the stream tagger updates the current stream indicator to indicate a new stream of I/O commands, the process ends.

Figure 4:
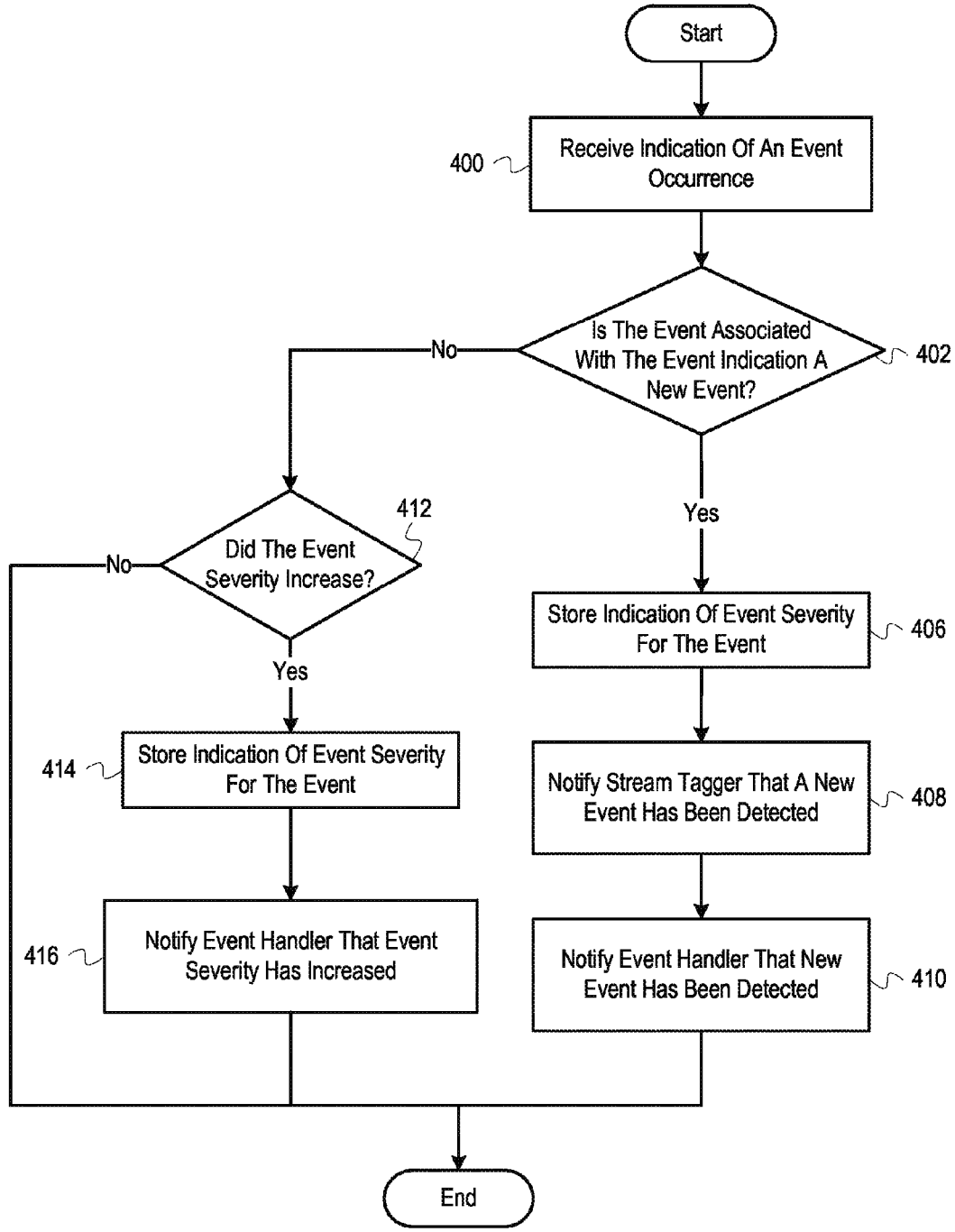
FIG. 4 depicts a flowchart of example operations for detecting an event.

FIG. 4 depicts a flowchart of example operations for detecting an event. The operations depicted in FIG. 4 can be performed by the event detector 106 of FIG. 1 or another component of a storage system.

At block 400, an event detector receives an event indication. The event detector can receive the event indication as part of an I/O command response or independently of an I/O command response. I/O command responses are received by a storage controller or other component that includes the event detector and are passed to the event detector for analysis. The event detector can look at various values in the I/O command response, such as a message field, error field, etc. If the I/O command response includes a field or value associated with an event, the event detector determines that an event occurred.

The event detector can also receive an event indication independent of an I/O command response. In other words, another component can notify the event detector that an event has occurred. For example, a component within a storage controller may be responsible for determining when an I/O command timeout has occurred. The component tracks the amount of time that has passed since each I/O command was sent to a storage device. The component also notes when a response to each I/O command is received. If a response to an I/O command is not received within a certain period of time, the component notifies the event detector that a timeout event has occurred. The event detector itself can include the functionality to detect timeout events.

As another example of the event detector receiving an event indication independent of an I/O command response, the event detector can be notified when various operational statistics reach certain thresholds. For example, a storage controller can maintain statistics about various aspects of a storage system's operations, such as the average latency of I/O commands or I/O command responses. If the average latency increases beyond a certain threshold, the component of the storage controller responsible for maintaining the statistics can notify the event detector that an event occurred.

Indications of events can include data related to the event, such as an event severity. For example, as described above, a storage controller can maintain various statistics about storage system operations. The storage controller can also maintain multiple thresholds for any particular statistic, such as average latency. When a particular statistic surpasses one of the thresholds, the storage controller can indicate the occurrence of the event as well as indicating the particular threshold that was surpassed. Each threshold can correspond to a particular severity. Event indications might not include the severity directly, but instead include data that allows the event detector to determine the severity. After the event detector receives the event indication, control then flows to block 402.

At block 402, the event detector determines whether the event associated with the event indication is a new event. To determine whether the event is a new event, the event detector determines a stream indicator associated with the event indication. Determining the stream indicator associated with the event indication can vary depending on the event itself or how the event indication was received at block 400. For example, if the event indication is received as part of an I/O command response, the event detector can analyze metadata associated with the I/O command for the stream indicator. If the event indication is received independent of an I/O command response, the event indication itself can include the I/O command stream indicator.

Once the event detector has determined the stream indicator associated with the event indication, the event detector can compare the determined stream indicator with the current stream indicator. If the determined stream indicator matches the current stream indicator, the event is a new event. If the determined stream indicator does not match the current stream indicator, the event is not a new event. If the event detector determines that the event is a new event, control then flows to block 406. If the event detector determines that the event is not a new event, control then flows to block 412.

At block 406, the event detector stores the severity of the event. Storing the severity of the event facilitates determining whether the event increases in severity. The event detector might store the severity by itself or as part of metadata related to an I/O command. The severity of the event can be stored by writing the severity to a particular location in memory. After the event detector stores the severity of the event, control then flows to block 408.

At block 408, the event detector notifies a stream tagger that a new event occurred, allowing the stream tagger to update the current stream indicator (thus starting a new stream of I/O commands). The event detector can notify the stream tagger via a function call(s), application programming interface call(s), inter-process messaging, etc. The event detector might also notify the stream tagger via a hardware mechanism, such as writing a value to a particular register or latch, sending a particular signal over a particular wire, etc. The notification might include additional data, such as the particular stream indicator associated with the event. After the event detector notifies the stream tagger that a new event has been detected, control then flows to block 410.

At block 410, the event detector notifies an event handler that a new event has been detected. The event detector can notify the event handler via a function call(s), application programming interface call(s), inter-process messaging, etc. The event detector might also notify the event handler via a hardware mechanism, such as writing a value to a particular register or latch, sending a particular signal over a particular wire, etc. The notification can include an indication of the type or severity of the event, allowing the event handler to handle the event accordingly. After the event detector notifies the event handler that a new event has been detected, the process ends.

Control flowed to block 412 if it was determined, at block 402, that the event is not a new event. At block 412, the event detector determines whether the event has increased in severity. In particular, the event detector compares the severity associated with the event indication received at block 400 to the severity of a previous event indication. If the severity associated with the event indication received at block 400 is greater than the stored severity, the event has increased in severity. If the severity associated with the event indication received at block 400 is less than or equal to the stored severity, the event has not increased in severity.

Event severity can be indicated using values that have a natural ordering, such as integers. To determine whether the severity of one event indication is greater or less than the severity of another event indication, the event detector can directly compare the values. In some instances, a lesser value indicates greater severity, while in some instances a greater value indicates greater severity. The comparison can be modified accordingly.

The indications of event severity can also be stored using values that do not have a natural ordering. In such cases, the event detector can use other techniques, such as looking up the ordering of the severities in a mapping table or sending a request to another component responsible for determining the ordering of the severities. A mapping table would map the indications of severity to another type of value that has a natural ordering. Utilizing a mapping table or another component can allow for severities to be configurable or dynamic without modifying the event detector itself. If the event detector determines that the event severity increased, control then flows to block 414. If the event detector determines that the event severity did not increase, the process ends.

At block 414, the event detector stores the new severity. Because a previous event severity is already stored, the event detector replaces the stored severity with the new event severity. The event detector thus maintains an indication of the greatest event severity for a particular stream of I/O commands. After the event detector stores the new severity, control then flows to block 416.

At block 416, the event detector notifies the event handler that the event severity has increased. The event detector thus allows the event handler to perform any additional operations to handle the greater severity. The event detector can include the new severity of the event, both the new severity and the previous severity, or an indication of the difference in severity. The event detector provides the event handler with sufficient data to allow the event handler to perform operations to handle the greater severity. After the event detector notifies the event handler that the severity has increased, the process ends.

The operations performed by an event detector to detect an event can vary. For example, the operations described in FIG. 4 assume that single persistent events are only handled multiple times if the severity increases. An event handler, however, might also handle events if the severity stays the same or decreases. Additionally, the circumstances in which an event handler handles events may vary based on the type of event, source of the event, or other characteristics. Thus, an event detector might perform additional (or fewer) operations to determine whether to notify an event handler that an event was detected.

Additionally, while the examples only discuss detecting one type of event, a storage controller can detect multiple types of events. For example, in addition to detecting resource contention events, a storage controller might detect maintenance events. The storage controller can maintain data, such as the event severity, for each individual type of event.

Many storage systems are more complex than those illustrated above. For example storage systems often have multiple storage devices and/or multiple controllers. Further, instead of a storage controller communicating with a storage device, a storage controller can have multiple ports that communicate with multiple ports on one or more storage devices. The disclosures herein can be adapted to work with more complex storage systems, as described below.

Figure 5:
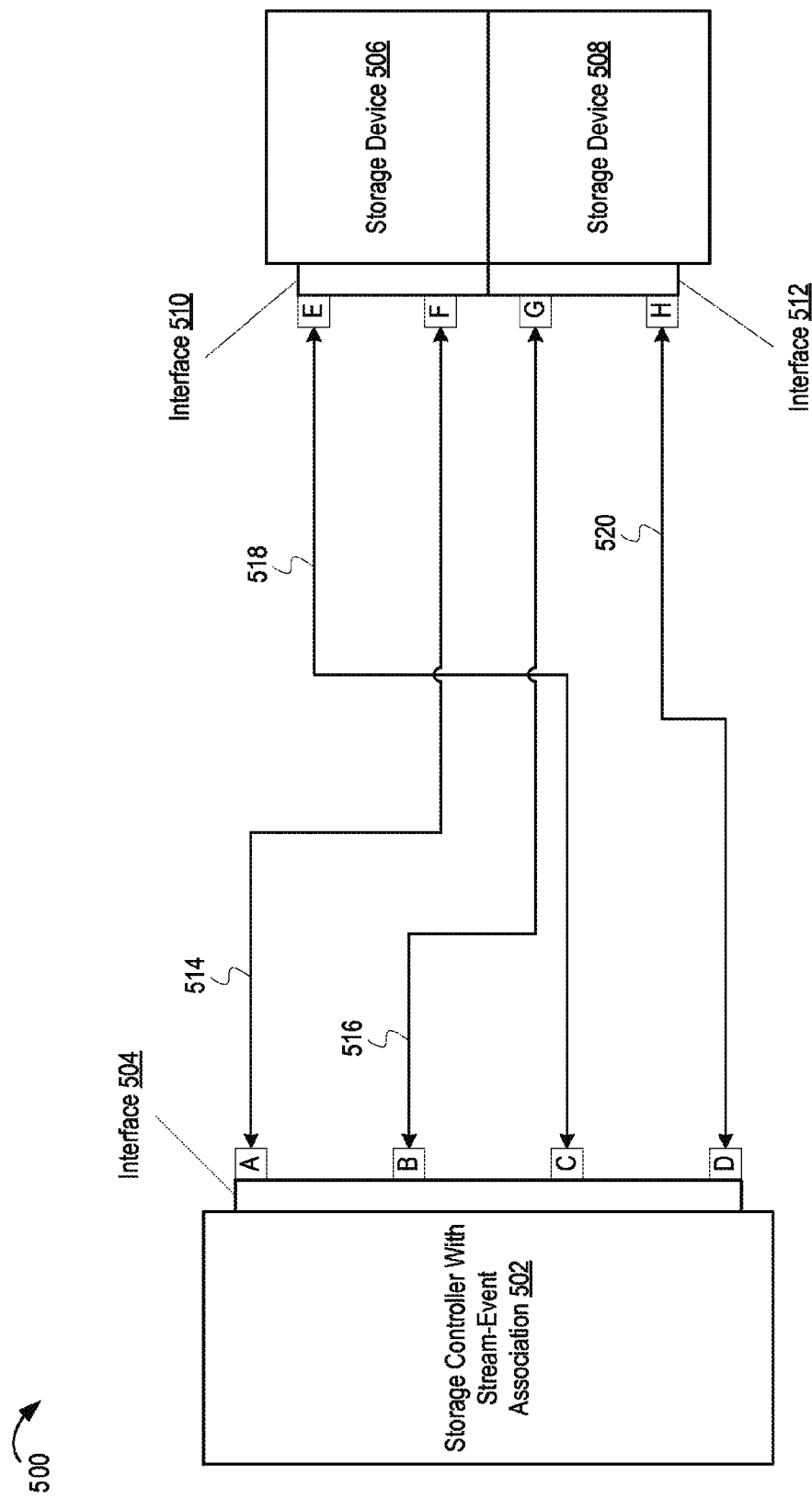
FIG. 5 depicts an example storage system with a storage controller that communicates with multiple storage devices through multiple ports.

FIG. 5 depicts an example storage system with a storage controller that communicates with multiple storage devices through multiple ports. FIG. 5 depicts an example storage system 500, including a storage controller 502 and storage devices 506 and 508. The storage controller includes an interface 504 with ports A, B, C, and D. Storage device 506 includes an interface 510 with ports E and F. Storage device 508 includes an interface 512 with ports G and H.

The ports associated with the storage controller 502 (ports A-D) are referred to herein as initiator ports. The ports associated with the storage devices 506 and 508 (ports E-H) are referred to herein as target ports. Each initiator port is coupled with a target port. In particular, port A is coupled with port F, as indicated by line 514; port B is coupled with port G, as indicated by line 516; port C is coupled with port E, as indicated by line 518; and port D is coupled with port H, as indicated by line 520. The connection indicated by the lines 514, 516, 518, and 520 are generally referred to as "paths". Each path is identified by the initiator port and the target port.

While ports can be thought of as physical ports coupled together with a physical cable, ports can also be virtualized. For example, interface 504 might only include two physical ports, one of which is coupled with interface 510, the other of which is coupled with interface 512. Each physical port, however, can include two virtualized ports (A, B and C, D respectively). Similarly, the interfaces 510 and 512 can each have a single physical port while having two virtualized ports.

Further, while the ports of FIG. 5 are depicted as being coupled directly to each other, the ports can be coupled through a switch. The switch can then be configured to map ports associated with the interface 504 to ports associated with interfaces 510 and 512.

The storage controller 502 can provide clients (not depicted) with a logical view to storage devices 506 and 508. For example, each storage device 506 and 508 can include multiple hard drives. However, instead of appearing as multiple storage devices with multiple hard drives, the storage controller 502 can make the storage devices 506 and 508 appear as a single logical drive. The storage controller 502 can also make the storage devices 506 and 508 appear as multiple logical drives while spreading the data between the various hard drives of both storage devices 506 and 508. Thus, when the storage controller 502 receives an I/O command from a client, the storage controller 502 might break the I/O command into multiple I/O commands that go to different ports. For example, a write command might indicate one particular logical drive, but is split up into two write commands by the storage controller 502. The storage controller 502 can then send one write command to storage device 506 via path 514 and one write command to storage device 508 via path 520.

Further complicating matters are the facts that multiple clients might be interacting with the storage controller 502 and that each storage device 506 and 508 can include storage controllers as well, possibly hiding the underlying storage from the storage controller 502.

In light of the various possible configurations of the storage system 500, streams of I/O commands can be defined in various manners as well. For example, the storage controller 502 can tag streams of I/O commands on a per target port basis. Thus, the storage controller 502 can maintain a current stream indicator for each target port. Target ports are examples of endpoints, which are entities or constructs that receive I/O commands. A particular interface or storage device might be an endpoint depending on the storage system configuration. Thus, the storage controller 502 might maintain a current stream indicator for other endpoints, such as interface 510 or storage device 506 (e.g., based on unique identifiers associated with the endpoint).

When multiple streams of I/O commands are defined, the storage controller 502 can maintain metadata and detect events for each stream of I/O commands. In other words, the storage controller 502 can perform operations on multiple streams of I/O commands separately. To facilitate handling multiple streams of I/O commands, the storage controller 502 can implement multiple stream taggers and multiple event detectors. For example, each stream of I/O commands can include a dedicated stream tagger and event detector.

The storage controller 502 can also implement a single stream tagger and event detector that handles all streams when multiple streams are defined. For example, assume that the storage controller 502 defines streams of I/O commands on a per target port basis. The storage controller 502 can maintain a table that includes an entry for each target port. Each table entry includes an indication of the associated target port, a current stream indicator, and a current severity. The storage controller 502 can also maintain a separate table that includes the current stream indicator for each stream if a stream tagger component cannot access the aforementioned table. Table 1, below, depicts an example table used by the storage controller 502 for the storage system of FIG. 5 when the streams of I/O commands are defined on a per target port basis and a single event detector component detects events for all streams of I/O commands.

TABLE 1

| Target Port | Current Event Severity | Current Stream Indicator |
|---|---|---|
| F | 1 | 5 |
| G | 3 | 3 |
| E | 5 | 6 |
| H | 4 | 7 |

After receiving an event indication, the storage controller 502 analyzes the metadata associated with the I/O command that corresponds to the event to determine the target port. Even if no I/O command response is received (e.g., if a timeout occurs), the storage controller 502 tracks the unique identifier of each I/O command, and can thus analyze the metadata associated with the I/O command.

Figure 6:
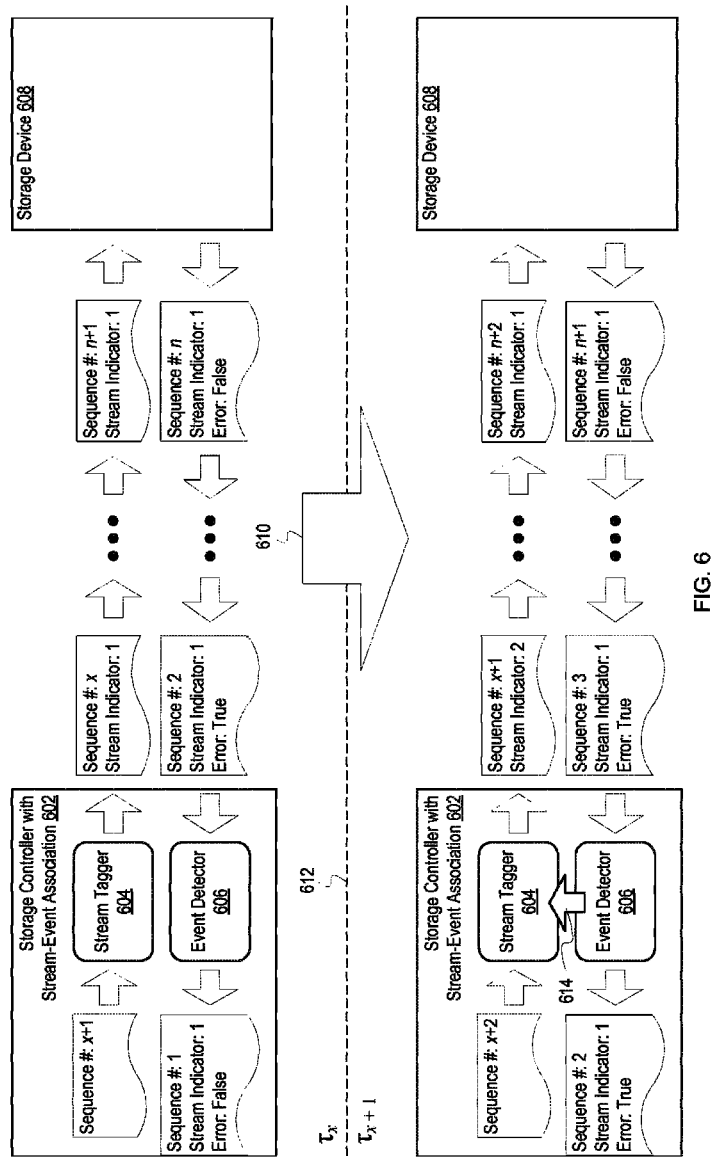
FIG. 6 depicts an example stream of I/O commands and I/O command responses as they flow through a stream tagger and event detector.

FIG. 6 depicts an example stream of I/O commands and I/O command responses as they flow through a stream tagger and event detector. FIG. 6 depicts a storage controller 602, including a stream tagger 604 and an event detector 606. FIG. 6 also depicts a storage device 608. Individual I/O commands and I/O command responses are indicated by their sequence numbers, 1 through x+2. Arrow 610 depicts the transition from time $\tau_x$ (depicted above the dashed line 612) to $\tau_{x+1}$ (depicted below the dashed line 612). I/O commands are depicted as flowing to the right, into the storage device 608. I/O command responses are depicted as flowing to the left, out of the storage device 608. While the types of detectable event indications can vary, the illustrations of FIG. 6 specifically depict the event indication as an error indicated by the I/O command response (e.g. "Error: True"). Further, the examples of FIG. 6 ignore event severity for the sake of simplicity.

Time $\tau_x$ depicts a first state of the stream of I/O commands and I/O command responses. Prior to flowing through the stream tagger 604, each I/O command has only a sequence number, as depicted by I/O command x+1. An I/O command stream indicator is added to each I/O command as the I/O commands flow through the stream tagger 604. The I/O commands flows to the storage device 608. The storage device 608 then generates I/O command responses to the I/O commands and includes the I/O command stream indicators from the I/O commands with the associated I/O command responses. The storage device 608 also indicates in the I/O command responses whether an error occurred. When the storage controller 602 receives the I/O command responses, the I/O command responses flow through the event detector 606.

At $\tau_x$, I/O commands 1 through n have been received by the storage device 608 and returned as I/O command responses. I/O commands and I/O command responses 1 through x have each been tagged as being associated with the same stream, indicated by stream indicator "1". I/O command response 1 has flowed through the event detector 606. Because I/O command response 1 indicates that there was no error ("Error: False"), the event detector 606 did not detect an event. I/O command response 2, on the other hand, will be the next I/O command response to flow through the event detector 606 and indicates that an error occurred ("Error: True").

At $\tau_{x+1}$, the stream of I/O commands (and associated I/O command responses) has moved forward one step. In particular, I/O command response 2, which indicates the occurrence of an error, flowed through the event detector 606. The event detector 606 thus detects an event and notifies the stream tagger 604, as indicated by the arrow 614. In response to the notification, the stream tagger updates the current stream indicator, incrementing the current stream indicator by one. Thus, when I/O command x+1 flows through the stream tagger 604, the stream tagger 604 tags I/O command x+1 with stream indicator "2". The stream of I/O commands beginning with I/O command x+1 and later will thus be tagged with stream indicator "2" until an event associated with stream indicator "2" is detected. Thus, the transition from stream indicator "1" to stream indicator "2" identifies a new stream of I/O commands.

I/O command response 3 also indicates that an error occurred. However, because I/O command response 3 is associated with the same stream of I/O commands as I/O command response 2, which triggered the stream indicator change, the event detector will ignore the event associated with I/O command response 3.

Figure 7:
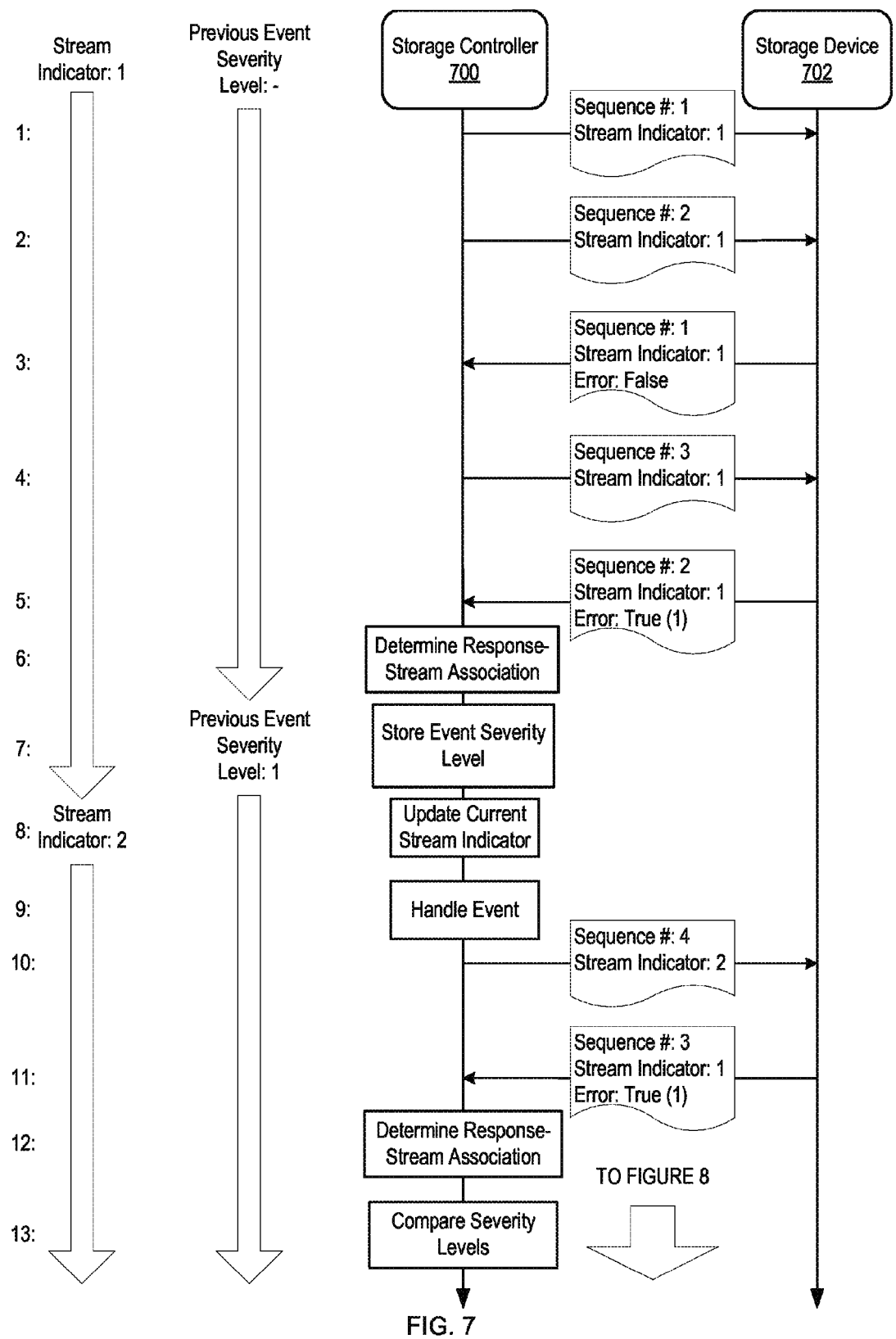
FIGS. 7-9 depict an example sequence of I/O commands and I/O command responses.
Figure 8:
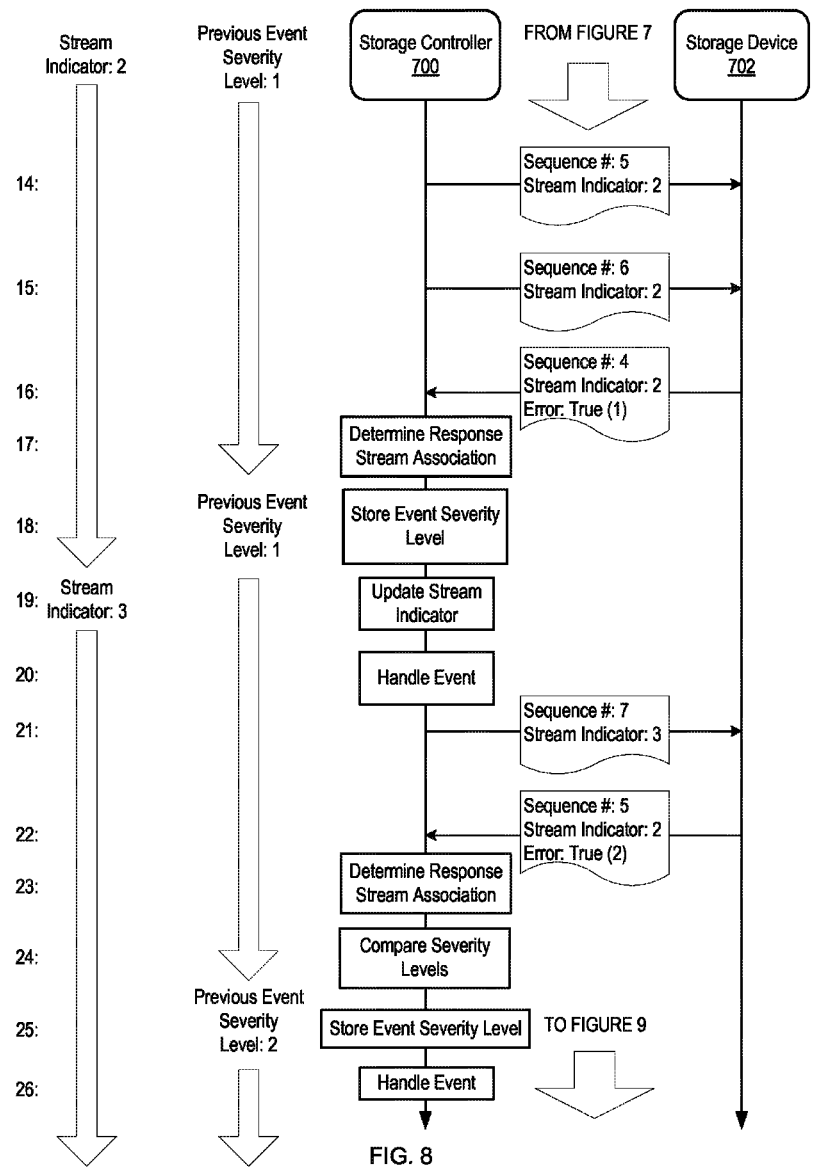
Figure 9:
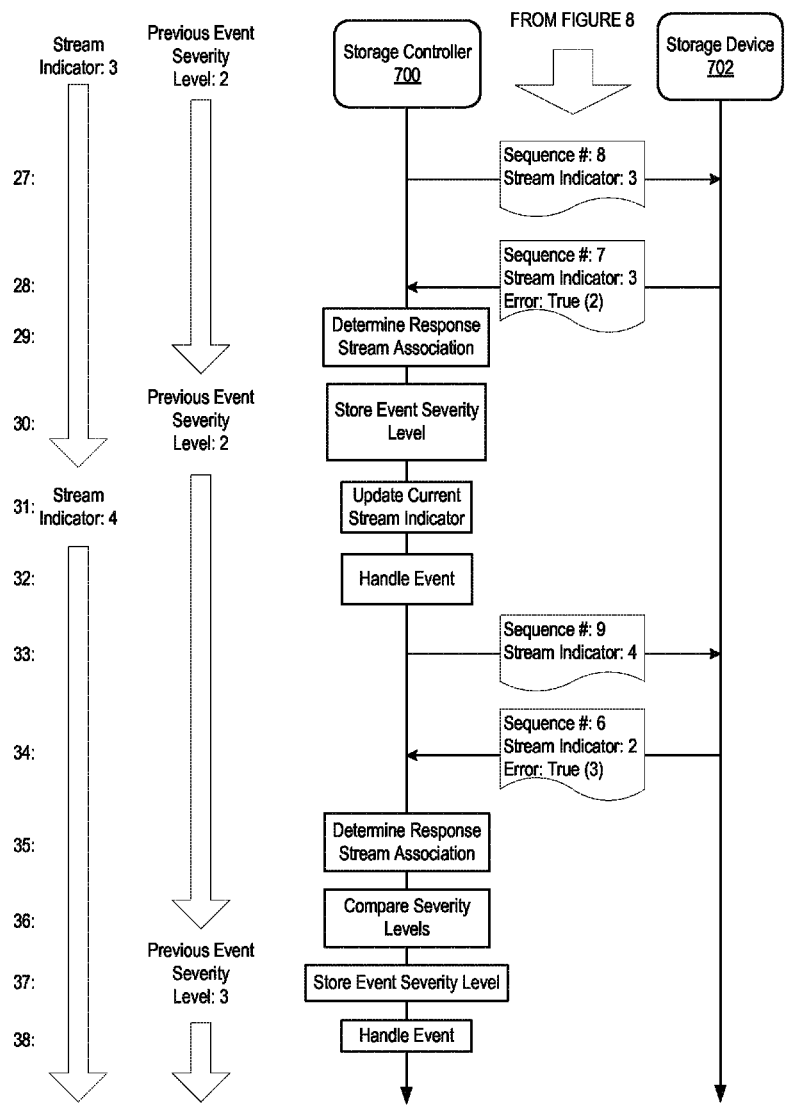

FIGS. 7-9 depict an example sequence of I/O commands and I/O command responses. The illustrated scenarios do not cover all possible scenarios, which can vary between configurations and storage systems. Additionally, as with FIG. 6, FIGS. 7-9 will use an indication of an error in an I/O command response as an example event indication. However, as described above, event indications can vary.

FIGS. 7-9 depict a storage controller 700 and a storage device 702. I/O commands are depicted as flowing from the storage controller 700 to the storage device 702 in chronological order. Individual steps are indicated by labels along the left side. Similarly, the current stream indicator and the previous event severity are also indicated along the left side. While FIGS. 7-9 depict various operations as occurring in specific orders, the orders depicted are merely examples and operations can be performed in different orders or in parallel. Each I/O command indicates a sequence number and an stream indicator. Each I/O command response indicates the sequence number of the associated I/O command, the stream indicator, and whether an error occurred. If the I/O command response indicates the occurrence of an error, the error severity is depicted in parentheses (e.g., "Error: True (1)"). The error severity is ordered according to the natural ordering of integers. In other words, an error severity of "1" is less severe than an error severity of "2" and an error severity of "2" is less severe than an error severity of "3".

Similar to the examples above, the examples of FIGS. 7-9 handle subsequent errors associated with the same stream of I/O commands if the subsequent errors are of a greater severity than the preceding error(s). As described above, storage systems can vary, however. Specific details of the operations described in FIGS. 7-9 that are described above or below are not repeated to avoid obfuscating the examples. Further, I/O commands and I/O command responses are described by their sequence number (e.g., "I/O command 1" and "I/O command response 1"). An I/O command response is a response to the I/O command that has the same sequence number.

FIG. 7 depicts steps one through thirteen of the sequence. The sequence number initially begins at one and increases in increments of one for each I/O command sent to the storage device 702. Similarly, the stream indicator initially begins at one and increases in increments of one for each new stream of I/O commands. Because FIG. 7 begins at the start of storage system operations, no previous event severity is saved.

At steps 1 and 2, the storage controller 700 sends I/O commands 1 and 2, respectively, to the storage device 702. Both I/O commands 1 and 2 include stream indicator 1, thus belonging to the same stream of I/O commands. As illustrated, the storage controller 700 need not wait for a response to a particular I/O command before sending a subsequent I/O command.

At step 3, the storage controller 700 receives I/O command response 1 from the storage device 702. The I/O command response 1 indicates that no error occurred. Thus, the storage controller 700 does not detect an associated event.

At step 4, the storage controller 700 sends I/O command 3 to the storage device 702. I/O command 3 includes stream indicator 1, thus belonging to the same stream of I/O commands as I/O commands 1 and 2.

At step 5, the storage controller 700 receives I/O command response 2 from the storage device 702. I/O command response 2 indicates that an error of severity "1" occurred. Based on the error indication, the storage controller 700 determines that an event occurred and performs operations for processing the event, indicated at steps 6-9.

At step 6, the storage controller 700 determines which stream the I/O command response is associated with. In this particular example, I/O command response 2 includes stream indicator 1, thus I/O command response 2 is associated with stream 1. The storage controller 700 also determines that no previous event has occurred. Accordingly, the storage controller 700 continues processing the event.

At step 7, the storage controller 700 stores the event severity of I/O command response 2. Storing the severity allows the storage controller 700 to determine if the severity of the event increases.

At step 8, the storage controller 700 updates the current stream indicator to reflect the beginning of a new stream of I/O commands. In this particular example, the stream indicator is incremented from "1" to "2".

At step 9, the storage controller 700 handles the event as a new event. In other words, because the event is a new event, the event is not handled incrementally, as would be the case if the event were not a new event.

Because I/O command 2 is the first event, the event severity is not used to determine whether the event should be handled in the first place. The event severity, however, might be used during the actual event handling. For example, the event severity may determine the extent to which the storage controller 700 compensates for a particular event. Usage of the event severity in event handling is discussed in more detail below.

At step 10, the storage controller 700 sends I/O command 4 to the storage device 702. I/O command 4 includes the current stream indicator "2", which was updated at step 8. Thus, I/O command 4 is the first I/O command of the new stream of I/O commands.

At step 11, the storage controller 700 receives I/O command 3 from the storage device 702. I/O command 3 indicates that an error of severity "1" occurred. Based on the error indication, the storage controller 700 determines that an event occurred and performs operations for processing the event, indicated at step 12.

At step 12, the storage controller 700 determines which stream I/O command response 3 is associated with. In this particular example, I/O command response 3 includes stream indicator 1, thus I/O command response 3 is associated with stream 1. The storage controller 700 also determines that the event indicated by I/O command response 3 is not a new event by comparing the stream indicator specified by I/O command response 3 and the current stream indicator.

At step 13, the storage controller 700 compares the event severity indicated in I/O command response 3 with the previous event severity. The event severity indicated in I/O command response 3 is "1", the same as the previous event severity. Because the event severity indicated in I/O command response 3 is the same as the previous event severity, the storage controller 700 does not handle the event.

FIG. 8 depicts steps fourteen through twenty-six of the sequence. The current stream indicator and previous event severity remain unchanged from step thirteen ("2" and "1", respectively).

At steps 14 and 15, the storage controller 700 sends I/O commands 5 and 6 to the storage device 702. Both I/O commands 5 and 6 include stream indicator 2, thus belonging to the same stream of I/O commands, along with I/O command 4.

At step 16, the storage controller 700 receives I/O command response 4 from the storage device 702. I/O command response 4 indicates that an error of severity "1" occurred. Based on the error indication, the storage controller 700 determines that an event occurred and performs operations for processing the event, indicated at steps 17-20.

At step 17, the storage controller 700 determines which stream the I/O command response is associated with. In this particular example, I/O command response 4 includes stream indicator 2, thus I/O command response 4 is associated with stream 2. Further, the storage controller 700 determines that the stream indicator of I/O command response 4 is different than the current stream indicator, thus indicating that I/O command response 4 indicates a new event. Accordingly, the storage controller 700 continues processing the event.

At step 18, the storage controller 700 stores the previous event severity, which remains "1".

At step 19, the storage controller 700 updates the current stream indicator to reflect the beginning of a new stream of I/O commands. In this particular example, the stream indicator is incremented from "2" to "3".

At step 20, the storage controller 700 handles the event as a new event. Because the event is a new event, the event is not handled incrementally, as would be the case if the event were not a new event.

At step 21, the storage controller 700 sends I/O command 7 to the storage device 702. I/O command 7 includes stream indicator 3, thus beginning a new stream of I/O commands.

At step 22, the storage controller 700 receives I/O command response 5 from the storage device 702. I/O command response 5 indicates that an error of severity "2" occurred. Based on the error indication, the storage controller 700 determines that an event occurred and performs operations for processing the event, indicated at steps 23-26.

At step 23, the storage controller 700 determines which stream the I/O command response is associated with. In this particular example, I/O command response 5 includes stream indicator 2, thus I/O command response 5 is associated with stream 2. Further, the storage controller 700 determines that current stream indicator is not 2, thus indicating that the event indicated by I/O command response 5 is not a new event. Accordingly, the storage controller 700 continues processing the event.

At step 24, because the event indicated by I/O command response 5 is not a new event, the storage controller 700 compares the severity of the event indicated with I/O command 5 and the previous event severity. Comparing the event severities allows the storage controller 700 to determine whether to handle the event. In this instance, the severity indicated by I/O command response 5 ("2") is greater than the previous event severity.

At step 25, the storage controller 700 stores the event severity indicated by I/O command response 5. Thus, the previous event severity becomes "2".

At step 26, the storage controller 700 handles the event as a previously detected event, but with a greater event severity. Because the severity of the event increased, the event is handled incrementally. In other words, the storage controller 700 performs operations that compensate for the greater severity.

FIG. 9 depicts steps twenty-seven through thirty-nine of the sequence. The current stream indicator and previous event severity remain unchanged from step twenty-six ("3" and "2", respectively).

At step 27, the storage controller 700 sends I/O command 8 to the storage device 702. I/O command 8 includes stream indicator 3, thus belonging to the same stream of I/O commands as I/O command 7.

At step 28, the storage controller 700 receives I/O command response 7 from the storage device 702. I/O command response 7 indicates that an error of severity "2" occurred. Based on the error indication, the storage controller 700 determines that an event occurred and performs operations for processing the event, indicated at steps 29-32.

At step 29, the storage controller 700 determines which stream the I/O command response is associated with. In this particular example, I/O command response 7 includes stream indicator 3, thus I/O command response 7 is associated with stream 3. Further, the storage controller 700 determines that the stream indicator of I/O command response 7 is not the same as the current stream indicator, thus indicating the occurrence of a new event. Accordingly, the storage controller 700 continues processing the event.

At step 30, the storage controller 700 stores the event severity of I/O command response 7. However, the previous event severity was "2" as well. Thus, the previous event severity remains "2".

At step 31, the storage controller 700 updates the current stream indicator to reflect the beginning of a new stream of I/O commands. In this particular example, the stream indicator is incremented from "3" to "4".

At step 32, the storage controller 700 handles the event as a new event. Because the event is a new event, the event is not handled incrementally, as would be the case if the event were not a new event.

At step 33, the storage controller 700 sends I/O command 9 to the storage device 702. I/O command 9 includes stream indicator 4, thus beginning a new stream of I/O commands.

At step 34, the storage controller 700 receives I/O command response 6 from the storage device 702. I/O command response 6 indicates that an error of severity "3" occurred. Based on the error indication, the storage controller 700 determines that an event occurred and performs operations for processing the event, indicated at step 35-38.

At step 35, the storage controller 700 determines which stream the I/O command response is associated with. In this particular example, I/O command response 6 includes stream indicator 2, thus I/O command response 6 is associated with stream 2. Further, the storage controller 700 determines that the event associated with I/O command response 6 is not a new event. Accordingly, the storage controller 700 continues processing the event.

At step 36, because the event indicated by I/O command response 6 is not a new event, the storage controller 700 compares the severity of the event indicated with I/O command 6 and the previous event severity. In this instance, the severity indicated by I/O command response 6 ("3") is greater than the previous event severity.

At step 37, the storage controller 700 stores the event severity indicated by I/O command response 6.

At step 38, the storage controller 700 handles the event as an event with a greater event severity. Because the event is not a new event, the event is handled incrementally. In other words, the storage controller 700 performs operations that compensate for the greater severity.

Persistent Event Handling

As described above, some events are localized, only applying to a particular I/O command (or small number of I/O commands). Some events, on the other hand, are more persistent and apply to streams of I/O commands. As above, resource contention events are used as example events to illustrate the handling of persistent events.

Resource contention events are typically persistent events. In other words, a resource contention event generally is not resolved until a storage device clears out some of the in-flight I/O commands. Thus, for example, a storage device might send multiple I/O command responses that all indicate that the storage device resources are low. Even though multiple I/O command responses are received, only one actual resource contention event has occurred.

One technique that a storage controller can implement to recover from a resource contention event is to dynamically change the maximum depth of an I/O command queue (hereinafter "queue"). As described above, a queue indicates all in-flight I/O commands (i.e., all I/O commands for which an I/O command response has not yet been received). The storage controller can be configured to stop sending I/O commands when the current queue depth exceeds a particular value referred to herein as the "maximum queue depth". By setting the maximum queue depth at a particular level, the workload at the storage device(s), at least with respect to the storage controller, is limited. For example, if the maximum queue depth is 100, only 100 I/O commands can be in-flight. If, on the other hand, the maximum queue depth is 200, then 200 I/O commands can be in-flight.

When a storage controller determines that a resource contention event has taken place, the storage controller can try to resolve the issue by using the maximum queue depth to effectively throttle the traffic to the storage device(s). In other words, continuing to send I/O commands to a storage device that is overloaded with traffic is generally not an effective way to resolve the problem. Throttling the amount of traffic to the storage device can help, however. The storage controller can thus lower the maximum queue depth to a number below the current queue depth. For example, if the maximum queue depth is 512 and the current queue depth is 150, lowering the maximum queue depth to 120 will prevent the storage controller from sending any additional I/O commands until at least thirty I/O commands are removed from the queue (e.g., by receiving I/O command responses, timing out, etc.). This can help the storage device catch up by clearing out its own queue of I/O commands before attempting to send more.

Applying the concept of stream tagging to the above example can help illustrate the usefulness of stream tagging and associating events to streams of I/O commands. Consider the above example when a storage controller does not implement stream tagging. The storage controller, when receiving multiple I/O command responses that indicate that the storage device resources are low, views each I/O command response as a distinct event. Thus, the storage controller may take compensatory action for each I/O command response that indicates a resource contention event.

Taking compensatory action for each I/O command response can result in overcompensation. Consider the above example in which the maximum queue depth is 512 and the current queue depth is 150. After receiving a first indication of a resource contention event, the maximum queue depth is dropped to 120. The storage controller then receives a second indication of a resource contention event and drops the maximum queue depth to ninety. Dropping the maximum queue depth the second time, however, might not be any more effective than dropping it the first time, thus unnecessarily restricting the queue depth and possibly decreasing performance of the storage system.

If the storage controller tags streams of I/O commands, the storage controller can determine that multiple indications of a resource contention event are associated with the single event. Thus, the storage controller can avoid lowering the maximum queue depth multiple times for a single resource contention event. Further, by comparing event severity, the storage controller can compensate more if the resource contention issue does not improve.

Once the maximum queue depth is lowered, the storage controller can increase it incrementally over time. For example, if the maximum queue depth is lowered to 120 from 512, the storage controller can subsequently increase the maximum queue depth by ten every five seconds. If the storage controller receives an indication of another resource contention event, the storage controller can adjust the maximum queue depth accordingly.

As above, resource contention events will serve as an example persistent event type and will hereinafter be referred to as "events".

Figure 10:
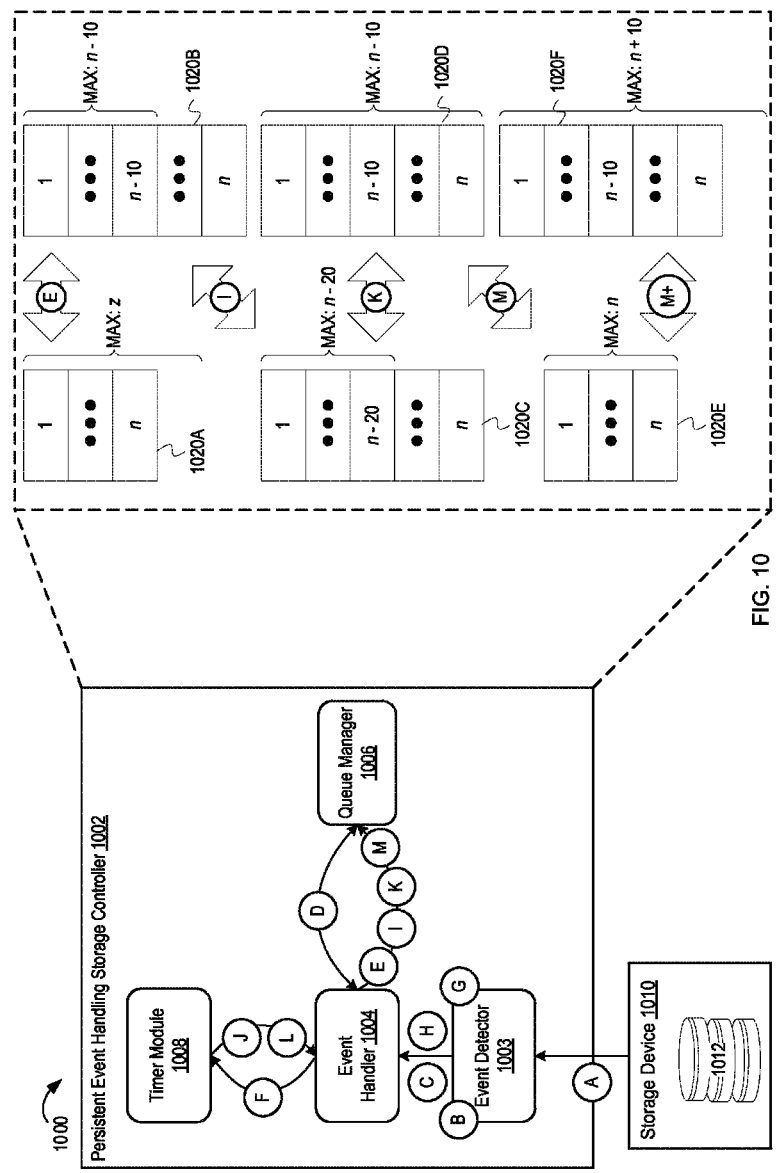
FIG. 10 depicts the operation of an example storage system with a persistent event handling storage controller.

FIG. 10 depicts the operation of an example storage system with a persistent event handling storage controller. FIG. 10 depicts a storage system 1000, including a persistent event handling storage controller (hereinafter "storage controller") 1002 and a storage device 1010. The storage controller 1002 includes an event detector 1003, event handler 1004, a queue manager 1006, and a time module 1008. The storage device 1010 includes a disk array 1012. FIG. 10 also depicts a series of changes to a queue 1020 labelled 1020A-D maintained by the queue manager 1006.

At stage A, the event detector 1003 receives an I/O command response from the storage device 1010 that indicates an event. The I/O command response indicates an event by inserting an indication of an error or message in the I/O command response. The I/O command response also includes a stream indicator that associates the I/O command response to a particular stream of I/O commands.

At stage B, the event detector 1003 determines that the I/O command response indicates the event by analyzing the I/O command response or metadata associated with the I/O command itself. The event detector 1003 also determines that the event is the first event for the particular stream of I/O commands that the I/O command response is associated with. To determine that the event is the first event for the particular stream of I/O commands, the event detector 1003 compares the stream indicator in the I/O command response with the current stream indicator that identifies the current stream of I/O commands. If the current stream indicator matches the stream indicator in the I/O command response, the event is the first event for the stream of I/O commands associated with the I/O command response.

At stage C, the event detector 1003 indicates to the event handler 1004 that an event was detected. The event detector 1003 can include an indication of the type of event (e.g., an event) or the severity of the event. The event detector 1003 might communicate with the event handler 1004 via a function call(s), application programming interface call(s), inter-process messaging, etc. The event detector 1003 might also communicate with the event handler 1004 via a hardware mechanism, such as writing a value to a particular register or latch, sending a particular signal over a particular wire, etc.

At stage D, the event handler 1004 determines the current queue depth and the maximum queue depth. The current queue depth corresponds to the current number of in-flight I/O commands, while the maximum queue depth corresponds to the maximum number of in-flight commands. To determine the current queue depth and the maximum queue depth, the event handler 1004 queries the queue manager 1006. In response to the query (or queries), the queue manager 1006 provides the current queue depth and maximum queue depth. The query and response between the event handler 1004 and the queue manager 1006 might be accomplished via a function call(s), application programming interface call(s), inter-process messaging, etc. The event handler 1004 might also communicate with the queue manager 1006 via a hardware mechanism, such as writing a value to a particular register or latch, sending a particular signal over a particular wire, etc.

Queue 1020A depicts the state of the queue 1020 at stage D. The current queue depth is represented by the number of elements in the queue, n. Thus, there are n in-flight I/O commands. The maximum queue depth is z, which is greater than the current queue depth.

At stage E, the event handler 1004 changes the maximum queue depth from z to n−10. To change the maximum queue depth, the event handler 1004 indicates to the queue manager 1006 that the maximum queue depth should be changed to n−10. The event handler 1004 can indicate the change to the maximum queue depth in a manner similar to querying the queue manager 1006, as described above. When the maximum queue depth is greater than or equal to the current queue depth, the maximum queue depth is typically changed to the current queue depth minus a back-off buffer value. In this example, the current queue depth is n, and the additional subtracted back-off buffer value is 10. However, the specific back-off buffer value can be configurable, can vary based on the event type or event severity, etc. For example, the back-off buffer value "10" might have been selected because the event was indicated as an error in an I/O command response. Had the event been indicated by a timeout, a back-off buffer value of "20" might have been selected instead. When the maximum queue depth is less than the current queue depth, the maximum queue depth can be changed in a manner similar to handling subsequent events with greater severities, as described below.

Queue 1020B depicts the state of the queue 1020 after stage E. The current queue depth remains n, while the maximum queue depth is now n−10. As queue 1020B illustrates, the maximum queue depth does not indicate the maximum number of I/O commands in the queue 1020 itself, but specifies at which point the storage controller 1002 stops adding additional I/O commands to the queue 1020

(i.e., stops sending I/O commands to the storage device 1020). For example, if the storage controller 1002 received additional I/O commands from a client while the queue 1020 was in the state illustrated by queue 1020B, the storage controller 1002 would not send the additional I/O commands to the storage device 1010.

At stage F, the event handler 1004 indicates that the timer module 1008 should notify the event handler 1004 after a certain period of time has elapsed. The specific period of time can be configurable and can vary depending on the particular event, severity of the event, etc. For example, because the event was indicated in the I/O command response, the timer might be set for five second periods, while if the event was indicated by an I/O command timeout (defined as being of greater severity), the timer might be for ten second periods. The timer module 1008 might allow the timer to be set for only a single period, making the event handler 1004 reset the timer for each additional period. The timer module 1008 might also allow the timer to be set once for multiple periods. For example, the timer module 1008 might notify the event handler 1004 every five seconds until the event handler 1004 specifically requests that the timer module 1008 stop. The examples herein will assume that the timer module 1008 notifies the event handler 1004 until the event handler 1004 indicates that the timer module 1008 should stop. The event handler 1004 might communicate with the timer module 1008 via a function call(s), application programming interface call(s), inter-process messaging, etc. The event handler 1004 might also communicate with the timer module 1008 via a hardware mechanism, such as writing a value to a particular register or latch, sending a particular signal over a particular wire, etc.

At stage G, the event detector 1003 receives an indication that an I/O command has timed out and determines that an event has occurred based on the indication of the I/O command timeout. The indication includes a stream indicator associated with the I/O command that timed out. The event detector 1003 compares the stream indicator associated with the I/O command that timed out with the stream indicator associated with the event detected at stage B. In this particular example, the stream indicators do not match, indicating that the I/O command that timed out is associated with the same stream as the I/O command response associated with the previous event.

The indication can also include a severity associated with the particular event. If the indication does not include a severity, the event detector 1003 might determine the severity by querying a table that maps event types with severities. Once the event detector 1003 has determined the severity of the current event, the event detector 1003 compares the severity of the current event with the severity of the previous event detected at stage B. If the severity of the current event is less than or equal to the severity of the previous event, no further action is taken. If the severity of the current event is greater than the severity of the previous event, the event detector 1003 notifies the event handler 1004. In this example, the severity of the current event is greater than the severity of the previous event.

At stage H, the event detector 1003 indicates to the event handler 1004 that an event was detected and that the event severity is greater. The event detector 1003 can include an indication of the type of event (e.g., an event) or the severity of the event. The event detector 1003 might communicate with the event handler 1004 via a function call(s), application programming interface call(s), inter-process messaging, etc. The event detector 1003 might also communicate with the event handler 1004 via a hardware mechanism, such as writing a value to a particular register or latch, sending a particular signal over a particular wire, etc.

At stage I, the event handler 1004 changes the maximum queue depth from n−10 to n−20. To change the maximum queue depth, the event handler 1004 indicates to the queue manager 1006 that the maximum queue depth should be changed to n−20. The event handler 1004 can indicate the change to the maximum queue depth in a manner substantially similar to that described above at stage E.

Queue 1020C depicts the state of the queue 1020 after stage I. At stage I, the event handler 1004 changed the maximum queue depth to n−20. The maximum queue depth is now n−20, which is less than the current queue depth, which remains at n. Thus, no additional I/O commands will be sent by the storage controller 1002 to the storage device 1010.

At stage J, the timer module 1008 notifies the event handler 1004 that the time period set at stage F has elapsed. The time module 1008 might notify the event handler 1004 via a function call(s), application programming interface call(s), inter-process messaging, etc. The timer module 1008 might also communicate with the event handler 1004 via a hardware mechanism, such as writing a value to a particular register or latch, sending a particular signal over a particular wire, etc.

At stage K, the event handler 1004 changes the maximum queue depth from n−20 to n−10. To change the maximum queue depth, the event handler 1004 indicates to the queue manager 1006 that the maximum queue depth should be changed to n−10. The event handler 1004 can indicate the change to the maximum queue depth in a manner substantially similar to that described above at stage E.

Queue 1020D depicts the state of the queue 1020 after stage K. At stage K, the event handler 1004 changed the maximum queue depth to n−10. The maximum queue depth is now n−10, which is less than the current queue depth, which remains at n. Thus, no additional I/O commands will be sent by the storage controller 1002 to the storage device 1010.

At stage L, the timer module 1008 notifies the event handler 1004 that the time period set at stage F has again elapsed. The time module 1008 might notify the event handler 1004 via a function call(s), application programming interface call(s), inter-process messaging, etc. The timer module 1008 might also communicate with the event handler 1004 via a hardware mechanism, such as writing a value to a particular register or latch, sending a particular signal over a particular wire, etc.

At stage M, the event handler 1004 changes the maximum queue depth from n−10 to n. To change the maximum queue depth, the event handler 1004 indicates to the queue manager 1006 that the maximum queue depth should be changed to n. The event handler 1004 can indicate the change to the maximum queue depth in a manner substantially similar to that described above at stage E.

Queue 1020E depicts the state of the queue 1020 after stage M. At stage M, the event handler 1004 changed the maximum queue depth to n. The maximum queue depth is now n, which is equal to the current queue depth Thus, no additional I/O commands will be sent by the storage controller 1002 to the storage device 1010.

Queue 1020F depicts the state of the queue 1020 if the maximum queue depth was incremented again after the elapsing of another period. Because the maximum queue depth would be increased to n+10 while the current queue depth remained n, the storage controller 1002 could begin sending I/O commands to the storage device 1010 again.

By periodically increasing the maximum queue depth, the storage controller 1002 is able to issue more I/O commands to the storage device 1010 (typically increasing performance). By incrementally increasing the maximum queue depth, the storage controller 1002 will be less likely to overwhelm the storage device 1010 by sending a large number of I/O commands within a short period of time. The combination of decreasing the maximum queue depth when an event occurs and periodically incrementing the maximum queue depth, the storage controller 1002 dynamically determines a queue depth that is appropriate for the operating conditions of the storage device 1010, even if they vary.

In the discussion above, the current queue depth remained static. When actually operating, the storage controller 1002 may receive I/O command responses during the process illustrated above. Thus, the current queue depth (n) may decrease. If the current queue depth decreases enough to fall below the maximum queue depth, the storage controller 1002 might begin sending I/O commands to the storage device 1010 again, regardless of whether the maximum queue depth is incremented. Similarly, under some conditions, the current queue depth can decrease without the storage controller 1002 having received an I/O command response. For example, the storage controller 1002 might treat a timed out I/O command as having received a response to that particular I/O command.

Detecting an event with a greater severity than a previously detected event (associated with the same stream of I/O commands) typically indicates that the problem is getting worse. Thus, there is a possibility that the previous modification to the maximum queue depth was not sufficient to remedy the problem. Thus, the event handler 1004 takes additional action by further reducing the maximum queue depth. The specific amount the maximum queue depth is reduced by can vary. For example, if a third event with even greater severity occurred, the maximum queue depth might be lowered from n−40 (an increment of twenty instead of ten). More generally, different events with different severities can result in varying compensatory behavior. The specific behavior can be configurable and can be based on the design of a storage system, testing of actual storage systems, arbitrary guesses, etc.

As another example of operational variations, the event handler 1004 can reset the timer module 1008 based on additional events. In the operations described above, the event handler 1004 does not reset or change the timer settings initially set at stage F. However, the event handler 1004 might reset the timer module 1008 with any additional event that is associated with the same stream of I/O commands. In other words, if three seconds into a five second timer have elapsed and the event handler 1004 receives an indication that another event has occurred, the event handler 1004 might reset the timer to five seconds. Similarly, if the event handler 1004 receives an indication that an event of greater severity has occurred, the event handler 1004 might increase the length of the timer to ten seconds.

In the illustrations below, the time period that an event handler waits before increasing the maximum queue depth is referred to as the adjustment period. The amount that the event handler increases the maximum queue depth by is referred to as the adjustment increment. The adjustment period and the adjustment increment can vary based on a couple of configurable options. First, the adjustment period and the adjustment increment vary based on the severity of the event. For example, the adjustment period might increase as the severity of the event increases. The back-off buffer can vary similarly. The specific values for the adjustment period, adjustment increment, and the back-off buffer can be stored in one or more tables. For example, consider the following example tables.

TABLE 2

(Back-off Buffer)

| Severity | Utilization Policy | |
|---|---|---|
| | Normal | Defer |
| 1 | 10 | 20 |
| 2 | 15 | 30 |
| 3 | 20 | 40 |
| 4 | 40 | 60 |

Table 2 depicts example back-off buffer values for four severities and two utilization policies. To determine the back-off buffer to use, an event handler looks up the value in the table based on the severity of the event and the utilization policy that is currently in place. The back-off buffer values correspond to numbers of entries in the queue of in-flight I/O commands maintained by a storage controller. For example, if an event handler was setting the maximum queue depth for an event of severity "3" and the current utilization policy is "defer", the event handler would set the maximum queue depth to the current queue depth minus the back-off buffer value "40".

TABLE 3

(Adjustment Period)

| Severity | Utilization Policy | |
|---|---|---|
| | Normal | Defer |
| 1 | 5 | 10 |
| 2 | 10 | 20 |
| 3 | 20 | 40 |
| 4 | 40 | 40 |

TABLE 4

(Adjustment Increment)

| Severity | Utilization Policy | |
|---|---|---|
| | Normal | Defer |
| 1 | 5 | 5 |
| 2 | 6 | 4 |
| 3 | 4 | 4 |
| 4 | 4 | 4 |

Tables 3 and 4 depict example adjustment periods and adjustment increments, respectively. As described above, the values in these tables can be determined based on the design of a storage system, experimental testing of a storage system, etc. While the descriptions below assume that the back-off buffer, adjustment period, and adjustment increment are all stored in tables similar to tables 2-4, storage systems can vary. For example, the data can be stored in a single three dimensional table, in a database, etc.

As described above, event indications can be associated with event severities. The specific associations can vary between event types, storage system configuration, etc. As an example, consider a resource contention event and the event severities indicated in Table 2. Event severity 1 might be associated with receiving an event indication in an I/O command response, such as receiving an I/O command response that indicates an I/O command queue at a storage device is full. Event severity 2 might be associated with a determination that the average latency for I/O command responses is greater than a threshold value. Event severity 3 might be associated with I/O command timeouts. Event severity 4 might be associated with a determination that the resources available to the device (e.g., storage controller or other initiator) that sends the I/O commands to the storage device are exhausted.

Figure 11:
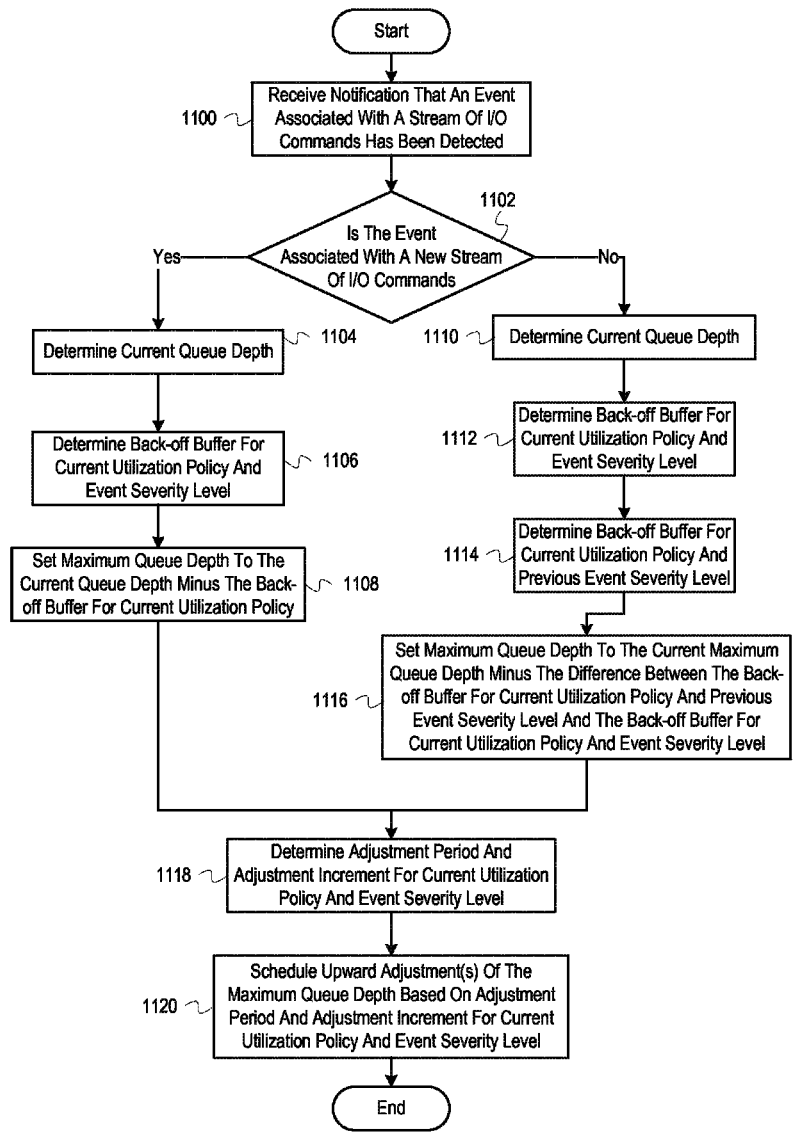
FIG. 11 depicts a flowchart of example operations for handling a persistent event, particularly an event.

FIG. 11 depicts a flowchart of example operations for handling a persistent event, particularly an event. The operations depicted in FIG. 11 can be performed by the event handler 1004 of FIG. 10 or another component of a storage system.

At block 1100, an event handler receives a notification that an event associated with a stream of I/O commands has been detected. The notification can come from an event detector, as described above at blocks 410 and 416 of FIG. 4. The notification can include the severity of the event, the severity of a previous event, and an indication of a current utilization policy. In some instances, the event handler can access the severity of the event, the severity of the previous event, or the indication of the current utilization policy directly. The notification can also indicate whether the event is associated with a new stream of I/O commands or the same stream of I/O commands associated with a previous event. After the event handler receives the notification that the event associated with the stream of I/O commands has been detected, control then flows to block 1102.

At block 1102, the event handler determines whether the event is associated with a new stream of commands. The event handler can determine whether the event is associated with a new stream of commands by analyzing the notification, comparing stream indicators associated with the event and a previous event, etc. If the event handler determines that the event is associated with a new stream of I/O commands, control then flows to block 1104. If the event handler determines that the event is not associated with a new stream of I/O commands, control then flows to block 1110.

At block 1104, the event handler determines the current queue depth. The event handler can determine the current queue depth by querying a queue manager, reading metadata associated with the queue, etc. After the event handler determines the current queue depth, control then flows to block 1106.

At block 1106, the event handler determines a back-off buffer for the current utilization policy and event severity. To determine the back-off buffer for the current utilization policy and event severity, the event handler looks up the back-off buffer in a table using the current utilization policy and event severity, as described above. The current utilization policy is typically a configurable option, which might be accessed by reading the current setting from memory or can be indicated to the event handler by another component. The event severity can be included in the notification to the event handler or can be read directly, as described above. After the event handler determines the back-off buffer for the current utilization policy and event severity, control then flows to block 1108.

At block 1108, the event handler sets the maximum queue depth to the current queue depth minus the back-off buffer for the current utilization policy. Thus, for example, assume that the current utilization policy is "defer", the event severity is "2", and the current queue depth is 150. Using Table 2, above, the event handler determines that the back-off buffer value to use is "30". Thus, the maximum queue depth is set to 120 (150–30). After the event handler sets the maximum queue depth to the current queue depth minus the back-off buffer for the current utilization policy, control then flows to block 1118.

Control flowed to block 1110 if the event handler determined, at block 1102, that the event is not associated with a new stream of I/O commands. At block 1110, the event handler determines the current queue depth. The event handler can determine the current queue depth by querying a queue manager, reading metadata associated with the queue, etc. After the event handler determines the current queue depth, control then flows to block 1112.

At block 1112, the event handler determines the back-off buffer for the current utilization policy and event severity. To determine the back-off buffer for the current utilization policy and event severity, the event handler can perform operations substantially similar to those described at block 1106. After the event handler determines the back-off buffer for the current utilization policy and event severity, control then flows to block 1114.

At block 1114, the event handler determines the back-off buffer for the current utilization policy and the severity of a previous event. The event handler can determine the severity of the previous event by analyzing the notification received at block 1000, accessing the data directly, etc. The event handler can determine the current utilization policy in a substantially similar manner to that discussed at block 1106. After the event handler determines the back-off buffer for the current utilization policy and the severity of a previous event, control then flows to block 1116.

At block 1116, the event handler sets the maximum queue depth to the current maximum queue depth minus the difference between the back-off buffer for the current utilization policy and the previous event severity and the back-off buffer for the current utilization policy and the current event severity. In other words, the event handler incrementally lowers the maximum queue depth to reflect the greater severity of the event. For example, assume that the current utilization policy is "normal", the previous event severity is "1", and the current event severity is "2". Based on the values in Table 2, the back-off buffer for the previous event is ten and the back-off buffer for the current event is fifteen. Thus, the event handler determines that the maximum queue depth should be lowered by five (15–10). The maximum queue depth can be set using operations substantially similar to those described at block 1108. After the event handler sets the maximum queue depth to the adjusted maximum queue depth, control then flows to block 1118.

Control flowed to block 1118 from blocks 1108 and 1116. At block 1118, the event handler determines an adjustment period and an adjustment increment for the current utilization policy and event severity. The adjustment period and the adjustment increment can be determined in a substantially similar manner to determining the back-off buffer. More particularly, the event handler can look up the adjustment period and the adjustment increment by looking up the values in one or more tables, querying a database, etc. For example, if the current utilization policy is "normal" and the event severity is "2", the adjustment period would be ten and adjustment increment would be six according to Tables 3 and 4. After the event handler determines an adjustment period and an adjustment increment for the current utilization policy and event severity, control then flows to block 1120.

At block 1120, the event handler schedules one or more upward adjustments of the maximum queue depth based on the adjustment period and the adjustment increment for the current utilization policy and event severity. To schedule an upward adjustment of the maximum queue depth, the event handler can store the adjustment increment and indicate to a timer module that the event handler should be notified after a time period equivalent to the adjustment period has elapsed. If the timer module (or whatever mechanism is used to schedule the upward adjustment(s)) continues to notify the event handler each time the adjustment period has elapsed, the event handler has effectively schedules multiple upward adjustments. After the event handler schedules one or more upward adjustments of the maximum queue depth based on the adjustment period and the adjustment increment for the current utilization policy and event severity, the process ends.

Figure 12:
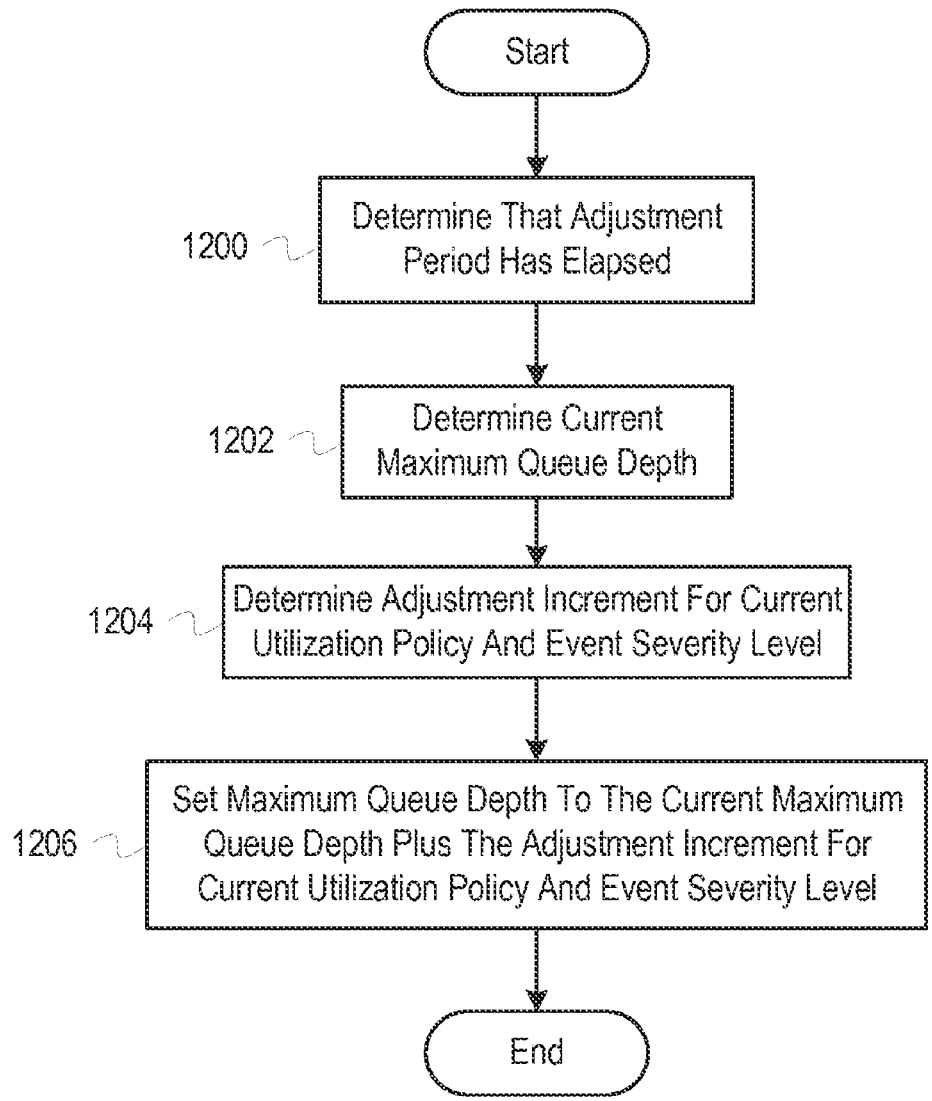
FIG. 12 depicts a flowchart of example operations for incrementally adjusting a maximum queue depth after an adjustment period has elapsed.

FIG. 12 depicts a flowchart of example operations for incrementally adjusting a maximum queue depth after an adjustment period has elapsed. The operations depicted in FIG. 12 can be performed by the event handler 1004 of FIG. 10 or another component of a storage system.

At block 1200, an event handler determines that an adjustment period has elapsed. The event handler can determine that the adjustment period has elapsed in response to receiving a notification from another component, such as a timer module. The event handler can determine that an adjustment period has elapsed by maintaining an indication of the adjustment period. For example, the event handler might maintain an indication that includes a timestamp corresponding to the end of the adjustment period. The event handler can periodically compare the timestamp corresponding to the end of the adjustment period with a timestamp corresponding to the current time. If the timestamp corresponding to the current time is greater than the timestamp corresponding to the end of the adjustment period, the event handler determines that the adjustment period has elapsed. After the event handler determines that the adjustment period has elapsed, control then flows to block 1202.

At block 1202, the event handler determines the current maximum queue depth. The event handler can determine the maximum queue depth in a manner substantially similar to that described at block 1110 of FIG. 11. After the event handler determines the maximum queue depth, control then flows to block 1204.

At block 1204, the event handler determines the adjustment increment for the current utilization policy and event severity. The event handler determines the adjustment increment by using the current utilization policy and event severity to look up the adjustment increment in a table, such as Table 4. The event handler might have determined the adjustment increment previously and stored it in memory for later use. If so, the event handler can read the appropriate memory location instead of looking up the adjustment increment in a table. After the event handler determines the adjustment increment for the current utilization policy and event severity, control then flows to block 1206.

At block 1206, the event handler sets the maximum queue depth to the current maximum queue depth plus the adjustment increment for the current utilization policy and event severity. For example, if the current utilization policy is "defer" and the event severity is "2", the event handler might determine that the maximum queue depth should be incremented by four, based on Table 4. The event handler can set the maximum queue depth in a substantially similar manner to that described at block 1108 of FIG. 11. After the event handler sets the maximum queue depth to the current maximum queue depth plus the adjustment increment for the current utilization policy and event severity, the process ends.

The examples above depict various components, like the event detector, event handler, and queue manager, individually. In some storage systems, one or more components might be combined into a single component. The operations described above can be adapted accordingly. For example, if the event detector and the event handler are combined as a single component, the event handler can likely access the various data used by the event detector, such as stored stream indicators from previous events, severities, etc. Thus, the event detector might not include that data in a notification to the event handler.

Further, while the examples above depict the stream tagger and event detector as being part of a storage controller, the stream tagger and event detector can be implemented on any storage system component that receives I/O commands. For example, the stream tagger and event detector might be located on a dedicated component that only includes the stream tagger and event detector functionality. Similarly, the stream tagger and event detector functionality can be separate of each other, perhaps located on different storage system components.

As example flowcharts, FIGS. 2-4, 11, and 12 present operations in an example order from which storage systems can deviate (e.g., operations can be performed in a different order than illustrated and/or in parallel; additional or fewer operations can be performed, etc.). For example, FIG. 11 assumes that the notification received by the event handler indicates that the severity of a previous event indication is less than a current event indication. In other words, the event handler described in relation to FIG. 11 does not actually compare the severities of different event indications. However, some event handlers might perform the actual comparison.

As will be appreciated by one skilled in the art, aspects of the disclosures herein may be embodied as a system, method or computer program product. Accordingly, aspects of the disclosures herein may be embodied entirely as hardware, entirely as software (including firmware, resident software, micro-code, etc.) or as a combination of software and hardware aspects that may all generally be referred to herein as a "circuit," "module" or "system." Furthermore, aspects of the disclosures herein may take the form of a program product embodied in one or more machine readable medium (s) having machine readable program code embodied thereon.

Any combination of one or more machine readable medium(s) may be utilized. The machine readable medium may be a machine readable signal medium or a machine readable storage medium. A machine readable storage medium may be, for example, a system, apparatus, or device that uses electronic, magnetic, optical, electromagnetic, infrared, or semiconductor technology, or a combination thereof. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium does not include transitory, propagating signals.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Program code for carrying out operations for aspects of the disclosures herein may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine. Examples of a machine that would execute/interpret/translate program code include a computer, a tablet, a smartphone, a wearable computer, a robot, a biological computing device, etc.

Figure 13:
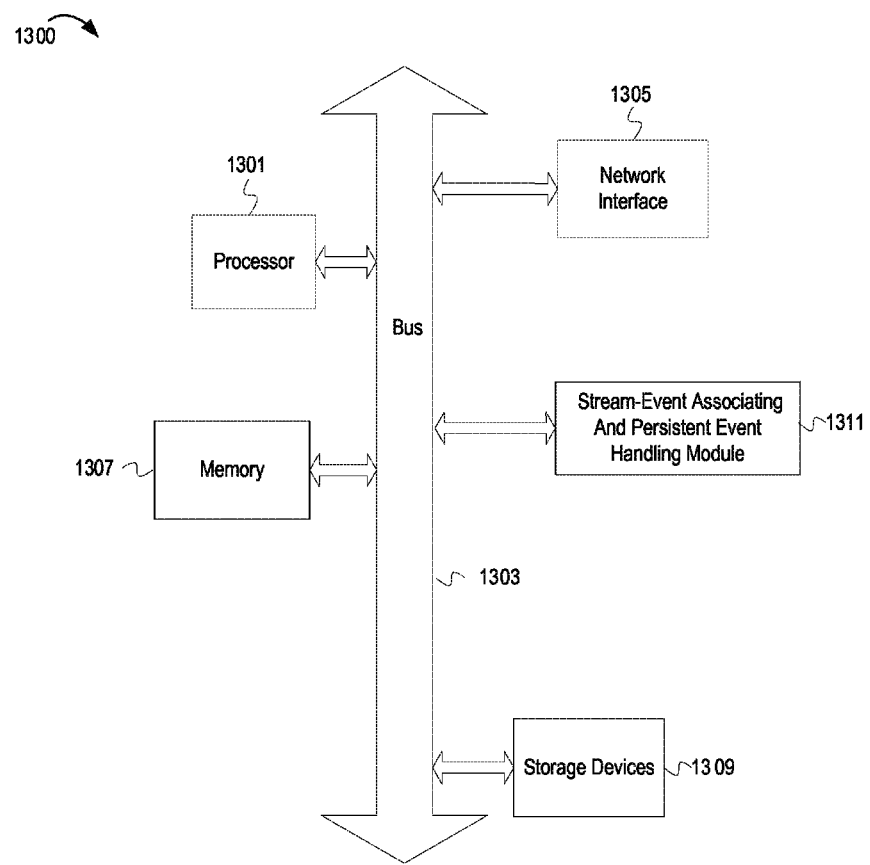
FIG. 13 depicts an example computer system including a stream-event associating and persistent event handling module.

FIG. 13 depicts an example computer system including a stream-event associating and persistent event handling module. A computer system 1300 includes a processor 1301 (possibly including multiple processors, multiple cores, multiple nodes, and/or implementing multi-threading, etc.). The computer system includes memory 1307. The memory 1307 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 1303 (e.g., PCI, ISA, PCI-Express, HyperTransport®, InfiniBand®, NuBus, etc.), a network interface 1305 (e.g., an ATM interface, an Ethernet interface, a Frame Relay interface, SONET interface, wireless interface, etc.), a storage device(s) 1309 (e.g., optical storage, magnetic storage, etc.), and a stream-event associating and persistent event handling module 1311. The stream-event associating and persistent event handling module 1311 tags streams of I/O commands with stream indicators before they are sent to a storage device. The stream-event associating and persistent event handling module 1311 also detects events associated with streams of I/O commands. If an event is detected, the stream-event associating and persistent event handling module 1311 determines the operations to perform in order to compensate for the event. The stream-event associating and persistent event handling module 1311 also performed the compensatory actions. The functionality of the stream-event associating and persistent event handling module 1311 can be partially (or entirely) implemented in hardware and/or on the processor 1301. For example, the functionality may be implemented with an application specific integrated circuit, in logic implemented in the processor 1301, in a co-processor on a peripheral device or card, etc. Further, realizations may include fewer or additional components not illustrated in FIG. 13 (e.g., video cards, audio cards, additional network interfaces, peripheral devices, etc.). The processor 1301, the storage device(s) 1309, and the network interface 1305 are coupled to the bus 1303. Although illustrated as being coupled to the bus 1303, the memory 1307 may be coupled to the processor 1301.

While the aspects of the disclosures herein are described with reference to various aspects and exploitations, it will be understood that these aspects are illustrative and that the scope of the disclosures herein is not limited to them. In general, techniques for detecting and handling persistent events in storage systems as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosures herein. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosures herein.

As used herein, the term "or" is inclusive unless otherwise explicitly noted. Thus, the phrase "at least one of A, B, or C" is satisfied by any element from the set {A, B, C} or any combination thereof, including multiples of any element.

What is claimed is:

1. A method comprising:
   receiving, by a storage server, an indication of an event, wherein the indication of the event corresponds to a first severity;
   determining, by the storage server, when the event is associated with a first stream of commands, wherein the first stream of commands comprises a plurality of commands sharing a same stream indicator;
   determining, by the storage server, when the indication of the event is a first indication of the event received by the storage server;
   setting, by the storage server, a maximum allowed count of in-flight commands to be less than a current count of in-flight commands, when the indication of the event is the first indication of the event received by the storage server;
   determining, by the storage server, that the first severity is greater than a second severity, when the indication of the event is not the first indication of the event received by the storage server, wherein the second severity corresponds to a previously received indication of the event; and
   decreasing, by the storage server, the maximum allowed count of in-flight commands, when the first severity is determined to be greater than the second severity.

2. The method of claim 1, wherein the decreasing the maximum allowed count of in-flight commands comprises:
   determining, by the storage server, a first buffer value based, at least in part, on the second severity;

determining, by the storage server, a second buffer value based, at least in part, on the first severity; and decreasing, by the storage server, the maximum allowed count of in-flight commands based on the difference between the first buffer value and the second buffer value.

3. The method of claim 1, wherein the setting the maximum allowed count of in-flight commands to be less than the current count of in-flight commands comprises setting the maximum allowed count of in-flight commands to be equal to the current count of in-flight commands minus a buffer value.

4. The method of claim 1, wherein the event comprises a resource contention event, the resource contention event providing an indication when there is a lack of available resources at a storage device.

5. The method of claim further comprising:
receiving, by the storage server, an indication of an adjustment period or an adjustment increment.

6. A non-transitory machine readable medium having stored thereon instructions for preforming a method comprising machine executable code which when executed by at least one machine, causes the machine to:
receive an indication of an event, wherein the indication of the event corresponds to a first severity;
determine when the event is associated with a first stream of commands, wherein the first stream of commands comprises a plurality of commands sharing a same stream indicator;
determine when the indication of the event is a first indication of the event that is received;
set a maximum allowed count of in-flight commands to be less than a current count of in-flight commands, when the indication of the event is the first indication of the event received by the storage server;
determine that the first severity is greater than a second severity, when the indication of the event is not the first indication of the event received by the storage server, wherein the second severity corresponds to a previously received indication of the event; and
decrease the maximum allowed count of in-flight commands, when the first severity is determined to be greater than the second severity.

7. The non-transitory machine readable medium of claim 6, wherein the decreasing the maximum allowed count of in-flight commands further comprises:
determining a first buffer value based, at least in part, on the second severity;
determining a second buffer value based, at least in part, on the first severity; and
decreasing the maximum allowed count of in-flight commands based on the difference between the first buffer value and the second buffer value.

8. The non-transitory machine readable medium of claim 6, wherein the setting the maximum allowed count of in-flight commands to be less than the current count of in-flight commands comprises setting the maximum allowed count of in-flight commands to be a value equal to the current count of in-flight commands minus a buffer value.

9. The non-transitory machine readable medium of claim 6, wherein the setting the maximum allowed count of in-flight commands to be less than the current count of in-flight commands comprises decreasing the depth of an input/output command queue.

10. A computing device comprising:
a memory containing a machine readable medium comprising machine executable code having stored thereon instructions for performing a method of event based tagging of storage system commands;
a processor coupled to the memory, the processor configured to execute the machine executable code to cause the processor to:
receive an indication of an event, wherein the indication of the event corresponds to a first severity;
determine when the event is associated with a first stream of commands, wherein the first stream of commands comprises a plurality of commands sharing a same stream indicator;
determine when the indication of the event is a first indication of the event that is received;
set a maximum allowed count of in-flight commands to be less than a current count of in-flight commands, when the indication of the event is the first indication of the event received by the storage server;
determine that the first severity is greater than a second severity, when the indication of the event is not the first indication of the event received by the storage server, wherein the second severity corresponds to a previously received indication of the event; and
decrease the maximum allowed count of in-flight commands, when the first severity is determined to be greater than the second severity.

11. The device of claim 10, wherein the processor is further configured to execute the machine executable code to cause the processor to decrease the maximum allowed count of in-flight commands further comprises the machine executable code executable code to cause the processor to:
determine a first buffer value based, at least in part, on the first severity;
determine a second buffer value based, at least in part, on the second severity; and
decrease the maximum allowed count of in-flight commands based on the difference between the first buffer value and the second buffer value.

12. The device of claim 10, wherein the setting the maximum allowed count of in-flight commands to be less than the current count of in-flight commands comprises setting the maximum allowed count of in-flight commands to be a value equal to the current count of in-flight commands minus a buffer value.

13. The device of claim 10, wherein the processor is further configured to be capable of executing the programmed instructions, which comprise the programmed instructions stored in the memory to:
receive an indication of an adjustment period or an adjustment increment.

14. The device of claim 10, wherein the setting the maximum allowed count of in-flight commands to be less than the current count of in-flight commands comprises decreasing the depth of an input/output command queue.

15. The device of claim 10, wherein the event comprises a resource contention event, the resource contention event providing an indication when there is a lack of available resources at a storage device.

16. The method of claim 1, wherein the setting the maximum allowed count of in-flight commands to be less than the current count of in-flight commands comprises decreasing the depth of an input/output command queue.

17. The non-transitory computer readable medium of claim 6, wherein the event comprises a resource contention event, the resource contention event providing an indication when there is a lack of available resources at a storage device.

18. The non-transitory computer readable medium of claim 6, further having stored thereon instructions that when executed by the processor cause the processor to perform steps further comprising:
  receiving an indication of an adjustment period or an adjustment increment.

* * * * *